(12) United States Patent
Neary

(10) Patent No.: US 7,124,589 B2
(45) Date of Patent: *Oct. 24, 2006

(54) POWER COGENERATION SYSTEM AND APPARATUS MEANS FOR IMPROVED HIGH THERMAL EFFICIENCIES AND ULTRA-LOW EMISSIONS

(76) Inventor: David Neary, 711 Manchester Trail Dr., Spring, TX (US) 77373

( * ) Notice: Subject to any disclaimer, the term of this patent is extended or adjusted under 35 U.S.C. 154(b) by 51 days.

This patent is subject to a terminal disclaimer.

(21) Appl. No.: 10/743,505

(22) Filed: Dec. 22, 2003

(65) Prior Publication Data

US 2005/0132713 A1    Jun. 23, 2005

(51) Int. Cl.
*F02C 3/34*    (2006.01)
*F02C 6/06*    (2006.01)

(52) U.S. Cl. ........................................ 60/784; 60/39.52
(58) Field of Classification Search .................. 60/784, 60/785, 39.52, 737
See application file for complete search history.

(56) References Cited

U.S. PATENT DOCUMENTS

| | | | |
|---|---|---|---|
| 3,949,548 A | 4/1976 | Lockwood, Jr. | |
| 4,528,811 A | 7/1985 | Stahl | |
| 4,841,721 A | 6/1989 | Patton et al. | |
| 5,678,408 A | 10/1997 | Janes | |
| 5,724,805 A | 3/1998 | Golomb | |
| 5,881,549 A | 3/1999 | Janes | |
| 5,970,702 A | 10/1999 | Beichel | |
| 6,269,624 B1 | 8/2001 | Frutschi | |
| 6,289,666 B1 | 9/2001 | Ginter | |
| 6,363,708 B1 | 4/2002 | Rakhmailov | |
| 6,532,745 B1 * | 3/2003 | Neary | 60/784 |
| 6,606,864 B1 | 8/2003 | MacKay | |
| 6,622,470 B1 | 9/2003 | Viteri et al. | |
| 6,637,183 B1 | 10/2003 | Viteri et al. | |
| 6,644,011 B1 | 11/2003 | Cheng | |

OTHER PUBLICATIONS

Robert Reed, "Furnace Operations"; 3rd Edition, Gulf Publishing Co. (See Attachment A-2 for detailed Chapters, page and line references).
Arthur H. Lefebvre, "Gas Turbine Combustion", 2nd Edition, Taylor & Francis. (See Attachment A-2 for detailed Chapters, page &line references).
GPA Engineering Data Book, 11th Edition, Gas Processors Assoc. (See Attachment A-2 for detailed Chapters, page & line references).
NIST Chemistry Webbook, NIST Standard Reference Database, Gas Phase IR Specctra from NIST/EPA Database (CO2 and H2O molecules). See Attachment A-2 for Printout Copies.
Irvin Glassman, "Combustion", 2nd Edition, Academic Press. Inc. (See Attachment A-2 for detailed Chapters, page & line references).

* cited by examiner

Primary Examiner—Ted Kim

(57) ABSTRACT

A power cogeneration system employing a partially-open gaseous fluid cycle method and apparatus devices for oxyfuel combustion conversion of a given hydrocarbon composition fuel's heat-value energy into mechanical or electrical power energy, and transferred useful heat energy, with accompanying large reductions of consumed fuel and undesirable exhaust emissions.

15 Claims, 2 Drawing Sheets

POWER COGENERATION SYSTEM AND APPARATUS MEANS FOR IMPROVED HIGH THERMAL EFFICIENCIES AND ULTRA-LOW EMISSIONS

BACKGROUND OF THE INVENTION

When Brayton Simple Cycle gas turbines operate as mechanical power drive sources to electric generators and other mechanically driven devices, atmospheric air is compressed and mixed with hydrocarbon gases or atomized hydrocarbon liquids for the resulting mixture's ignition and combustion at constant pressure. To produce power, the hot combustion and working motive fluid gases are expanded to near atmospheric pressure across one or more power extraction turbine wheels, positioned in series.

The majority of Brayton simple open-cycle aero-derivative-style low nitrogen oxide emission (that may hereafter be referred to as Low-$NO_x$) current art gas turbines are predominantly presently limited in achieving shaft output horsepower rating with 26% to 39% thermal efficiencies, whereas most simple cycle industrial-style Low-$NO_x$ art gas turbines are predominantly presently limited in achieving shaft output horsepower rating with 27% to 34% thermal efficiencies. The aero-derivative turbine higher efficiencies are achieved when the gas turbines operate with compressor ratios ranging from 14 to 35 and predominant first stage turbine inlet temperatures ranging from 2000° to 2300° F.

Existing gas turbines employ combustion chamber air/fuel combustion chemical reactions, wherein the elements of time and high peak flame temperatures increase the presence of disassociation chemical reactions that produce the fugitive emissions of carbon monoxide (that may hereafter be referred to as CO) and other chemical reactions that produce nitrogen oxides (that may hereafter may be referred to as $NO_x$).

The best available applied turbine low $NO_x$ combustion technology for limiting gas turbine $NO_x$ emissions, using stiochiometric air/fuel primary combustion reaction chemistry means, still results in the production of $NO_x$ and CO that are no longer acceptable for new power or energy conversion facilities in numerous states and metropolitan environmental compliance jurisdictions. With the current art gas turbine's use of compressed atmospheric air as a source of oxygen (that may hereafter be referred to as $O_2$) which acts as a fuel combustion oxidizing reactant, the air's nitrogen (that may hereafter be referred to as $N_2$) content is the approximate 78% predominant mass component within the cycle's working motive fluid. Due to its diatomic molecular structure, the nitrogen molecules are capable of absorbing combustion heat only through convective heat transfer means resulting from their collisions with higher temperature gas molecules or higher temperature interior walls of the combustion chamber.

Despite the very brief time it takes for a current art gas turbine to reach a average primary combustion zone gas resultant temperature of less than 2600° F. within its combustion chamber, there are sufficient portions of the combustion zone gases that experience temperatures in excess of 2600° F. to 2900° F. for an ample period of time for the highly predominate nitrogen gas to enter into chemical reactions that produce nitrogen oxides. The same combined elements of time and sufficiently excessive high temperature permit carbon dioxide to enter into dissociation chemical reactions that produce carbon monoxide gas.

To achieve a goal of greatly reducing a turbine power unit's $NO_x$ and CO fugitive emissions, it is necessary to alter both the fuel combustion chemical reaction formula and the means by which acceptable combustion chamber temperatures can be closely controlled and maintained within a power turbine unit's fuel combustion chamber assembly. Maintenance of an acceptably low selected fuel combustion peak gas temperature at all times and throughout all portions within the combustion chamber assembly, requires a change in the means by which the heat of combustion can be better controlled and more rapidly distributed uniformly throughout the gases contained within the fuel combustion chamber assembly.

To achieve a goal of significantly reducing a turbine power cogeneration system's mass emission rate of the "greenhouse gas" (otherwise referred to as carbon dioxide or that may hereafter be referred to as $CO_2$) by a desired percentage amount, it is necessary to proportionally increase the thermal efficiency of a power cogeneration system which therein proportionally reduces the amount of combusted hydrocarbon fuel required to provide the energy conversion into a given amount of required work and usefully applied residual heat energy.

It has been well known and practiced for decades that higher humidity air and injected water or steam commingled with conventional air combustion gases increases combustion flame speeds and fuel combustion thermal efficiencies within gas turbines and other fuel combustion heater-burner apparatus using air/fuel combustion. It has also been well known and practiced that partially re-circulating combustion exhaust or flue gases containing carbon dioxide and water vapor back into a combustion chamber results in a reduced level of nitrogen oxides within the fuel combustion exhaust gases. Due to the high temperatures and speed of completed fuel combustion, the scientific community has been unable to reach a consensus as to precisely what series of altered chemical reactions occur when water vapor and/or carbon dioxide is introduced into a turbine combustion chamber.

Oxy-fuel combustion heater-burners have been employed for many years in the steel and glass making industries to furnish desired 3000+ degree Fahrenheit combustion gas temperatures into furnaces to avoid the production of high $NO_x$ emissions (but at the expense of high CO emissions). Both the present air separation art methods' high energy costs of producing acceptable combustion grade oxygen, and the lack of devised combustion system methods to control preset desired oxy-fuel combustion heater-burner or combustion chamber uniform maximum temperatures, have curtailed oxy-fuel combustion applications within present energy conversion facilities.

Current art gas turbines must be de-rated from their standard ISO horsepower or kW ratings at ambient temperatures exceeding 59° F., or at operating site altitudes above sea level. Thus, during summer's peak power demand periods, when the ambient temperature can increase to 95° F., 12% to 18% horsepower derations of a conventional gas turbine's ISO rating can occur. It is obviously desirable that a power turbine/generator unit within a cogeneration system not be susceptible to such on-site ambient temperature derations when peak power demands occur.

The current and future projected increasing costs of purchased utility electric power and natural gas (or liquid hydrocarbon fuel) and the accepted projected future trend in the future of "distributed power" facilities, coupled with present and future environmental constraints on fuel combustion exhaust emissions, will make it commercially mandatory that such "distributed power" facilities have the combined attributes (at the minimum) of combined ultra-low $NO_x$ and CO exhaust emissions and substantially higher thermal efficiencies than offered by current art turbine power cogeneration systems. It can be expected that the number of new turbine powered 'cogeneration system' facilities in the world will be significantly greater than the number of turbine powered 'combined-cycle' facilities that are devoted purely to the production of electric power. The referenced 'cogeneration system facilities' are not new in concept. Such facilities became highly popular in the 1970's (then referred to as 'Total Energy Plants') and were aggressively promoted by many natural gas utilities. Reciprocating gas engine-driven generator sets were the predominant producers of prime power and utilized waste heat. These 'Total Energy Plant' facilities efficiently provided electricity, hot water or steam for domestic hot water and building heating requirements, and chilled water for air conditioning. 'Total Energy Plants' were widely applied to serve hospitals, universities, large office buildings or building complexes, shopping centers, hotels, food processing plants, multi-shift manufacturing and industrial facilities, etc. The 50 plus years old predecessor to the 'Total Energy Plant' concept was the central electric power and steam plants that continue to currently serve some large eastern U.S. cities, and more predominantly European cities and metropolitan areas. Predominantly, 'Total Energy Plants' and current cogeneration facilities have had less than 100 psig utility supplies of natural gas available to their facilities.

SUMMARY OF THE INVENTION

To achieve both power turbine ultra-low $NO_x$ and CO exhaust emissions (as well as reduced "greenhouse gas" $CO_2$ and enhanced simple-cycle operating thermal efficiencies, the inventor's AES turbine cycle system and apparatus is described in U.S. Pat. No. 6,532,745 dated Mar. 18, 2003. The cited invention's further described partially-open gas turbine cycle contains multiple heat recovery devices for transferring waste heat to varied process gases and steam resulting in a cogeneration facility overall maximum thermal efficiency that "may approach 100%".

The present invention describes the means by which the cited partially-open AES turbine cycle system and apparatus can be incorporated into a simplified and improved gas turbine cogeneration system having simplified apparatus means and that can further achieve increased turbine cogeneration system thermal efficiencies which can exceed 115%.

The present invention further describes the alternative system and apparatus means for the cited improved partially-open turbine cogeneration system that can be employed within a desired power cogeneration system design, the said alternative system and apparatus means incorporating portions of the heater cycle system and apparatus content cited in the inventor's U.S. patent application Ser. No. 10/394,847 filed Mar. 22, 2003, now U.S. Pat. No. 7,074,033, titled "Partially-Open Fired Heater Cycle Providing High Thermal Efficiencies and Ultra-Low Emissions". The addition of these alternatives to the presented turbine based cogeneration system, as later further described and shown in FIG. 2, can increase the presented cogeneration system's overall thermal efficiency to greater than 115%.

The commercial viability of achieving maximum reductions in the presented invention's enhanced cogeneration system's fuel operating costs and accompanying reduced $NO_x$, CO, and $CO_2$ exhaust emissions are assured by the presented invention's oxy-fuel combustion system's access to a facility-provided ultra-high electric energy efficient modular air separation system providing a 93% to 95% purity predominant oxygen fuel oxidizing stream, such as presented in the inventor's U.S. patent application Ser. No. 10/658,157 dated Sep. 9, 2003 and titled "Pure Vacuum Swing Adsorption System and Apparatus" that can provide a 75% reduction in kWh/Ton of produced predominant oxygen gas mixture, the application subsequently granted U.S. Pat. No. 6,878,186 dated Apr. 12, 2005.

To achieve the cogeneration system's ultra-low fugitive exhaust emissions, the cited partially-open power cogeneration system and apparatus means provides a continuous controllable mass flow rate of recycled superheated vapor-state predominant mixture of carbon dioxide and water vapor (that may hereafter be referred to as $H_2O$), in identical mixture Mol percent proportions as each occurs as products of chemical combustion reactions from the gaseous or liquid hydrocarbon fuel employed.

To achieve the cogeneration system's ability to employ gaseous hydrocarbon fuels, other than gas utility distribution quality natural gas, gaseous fuels (containing toxic and/or difficult to combust hydrocarbon molecular gases) can be rapidly carried through useful heat conversion and/or completed incineration with the inventions provided system and apparatus means to control the primary combustion zone temperature. Whereas the invention example system's presented controlled gas mass flow rates and temperatures are capable of producing and exhausting 1800° F. combustion chamber assembly gas temperatures to the power turbine assembly (while maintaining herein described high thermal efficiencies and ultra-low emissions), the preferred example 2400° F. primary combustion zone temperature may achieve a desired 7.585 greater chemical reaction rate than that occurring at 1800° F. As repeatedly verified by John Zink Research in applied research, the reaction rate formula is:

$$\text{Reaction Rate Increase} = (N) = \frac{[(2400° \text{ F.}+460) \div (1800° \text{ F.}+460)] - 1}{.035}$$

Provided herein is both a partially-open turbine power cogeneration system with apparatus means for use therein of either modified current type gas turbine unit configurations, or alternative turbine assembly unit apparatus configurations that can utilize separate existing low cost mechanical equipment components and combustion chamber assemblies which are predominantly not designed for, nor applied to, the manufacture of current art gas turbines nor the said components and combustion chamber assemblies incorporation into facility designs of current technology gas turbine cogeneration systems.

The invention's combined employed cited partially-open gas turbine cycle system and apparatus and alternative added cited heater cycle system stream and apparatus portion into the present invention therein provides for a commonly 'shared non-air' working motive fluid means that is essential to the 95% to 100% reduction of $NO_x$, and CO mass flow emissions from those of current art Low-$NO_2$ designed gas turbines and other conventional fuel combustion heater-burner devices that can be applied within existing art power cogeneration systems.

It is an first objective of the present invention's improved power cogeneration system and apparatus means to provide a new benchmark standard for Best Available Technology (hereafter may be referred to as B.A.T.) in achieving combined highest thermal efficiencies, lowest emissions, and lowest auxiliary facility operating power consumptions within an overall operating power cogeneration facility.

It is a second objective of this invention to provide the means by which the power cogeneration system's production of steam or hot water, and/or the heating of process fluids, is not limited by the amount of a turbine/generator or mechanical drive train's available exhaust waste heat derived from a given production level of electric power or mechanical horsepower.

It is a third objective of this invention to provide the means by which the power cogeneration system's presented alternate apparatus can comprise current art individual power train unit components that can be adapted to individual unit power generator ratings of 200 kW to 30 MW+ to satisfy most cogeneration facilities' installed individual unit rating requirements.

It is a fourth objective of this invention to provide the collective means by which deviations from the presented invention's example operating conditions can be made to best accommodate a facility designer's incorporation of existing models of other facility auxiliary equipment that can be further incorporated into a specific design of cogeneration facility, such as currently manufactured absorption chillers or mechanically-driven refrigeration chillers that have been conventionally or similarly applied in related waste heat recovery power facilities for over 30 years.

It is a fifth objective of the present invention's cogeneration system and apparatus means to accomplish both a highly accelerated oxy-fuel combustion process and the added means to separately control a preset maximum primary combustion zone temperature and the tertiary zone exhaust gases temperature supplied to the hot gas expander power turbine assembly. This satisfied objective eliminates the elements of sufficient time and high degree of temperature that is required for endothermic dissociation chemical reactions to occur that produces both $NO_x$ and $CO$ within the primary combustion zone product gases.

It is a sixth objective of the present invention of improved system and apparatus means that a power system modified current art gas turbine assembly or alternative new style re-configured turbine train assembly can be capable of achieving an additional 35% to 40% in power cogeneration system thermal efficiencies than are available in current art B.A.T. gas turbine powered cogeneration facilities.

It is a seventh objective of the present invention of improved system and apparatus means that the cited incorporated partial-open gas turbine cycle system and apparatus means of preferred high efficiencies can employ but not be limited to gas compression ratios of 2.4 to 6.4 (2.1 to 6.5 Bar operating pressure) as compared to current art individual gas turbines that may have a compression ratio ranging between approximately 9 to 35.

It is an eighth objective of the present invention of improved system and apparatus means that the cited partial-open gas turbine cycle system and apparatus can provide the maximum cogeneration thermal efficiencies with facility fuel gas supply pressures of less 100 psig (6.9 bar).

It is a ninth objective of this invention to provide the means wherein, during a steady-state power operation, that the atmospheric vented and open cycle portion of the cogeneration system recycled exhaust mass flow can be approximately 5 to 8% of the total working motive fluid mass flow rate as contained within the closed portion of its turbine power cogeneration system.

It is a tenth objective of this invention to provide the means whereby both the cited partial-open AES turbine cycle system and apparatus as applied within the present invention of improved cogeneration system efficiency, and the alternative cogeneration system apparatus means described herein, can include appropriate safety sensor and system fluid flow control device means. Both the presented invention's cogeneration system and apparatus component means and the separately associated cogeneration power plant auxiliaries can be monitored and controlled for safe operation, as well as having provided means for controlling the cogeneration system's individual system fluid flows in response to changes in electric power generation demands and effective heat extraction demands by supplied steams of steam or hot water, or process fluids.

It is an eleventh objective of this invention to provide the apparatus and control means by which a non-distribution quality of gaseous hydrocarbon fuel (containing toxic and/or difficult to combust hydrocarbon molecular gases) can be rapidly carried through oxy-fuel combustion to a useful heat conversion and/or completed incineration.

The following nine Embodiments comprise the subject matter of the invention:

First Embodiment

The working motive fluid of this invention's turbine cogeneration system comprises a continuous superheated vapor mixture of predominant carbon dioxide and water vapor in identical Mol percent ratio proportions as the $CO_2$ and $H_2O$ molecular combustion product components are produced from the combustion of the gaseous or liquid hydrocarbon employed fuel.

Within the predominately-closed portion of the presented cogeneration system and apparatus, the re-circulated turbine exhaust gas is routed from an exhaust gas distribution manifold containing exhaust gas having a small degree of superheat temperature and positive gage pressure supply with connectivity to the inlet of the primary recycle compressor. The exhaust gas recycle compression function can be performed by a more typical axial compressor section used for air compression within a current art gas turbine unit, or it may be a separately means-driven compressor of the axial, centrifugal, or rotating positive displacement type. Either means of compression can incorporate means of flow control available within the compressor or by its driver's varied speed, with flow changes being initiated by a master system control panel containing programmable microprocessors.

The compressor can increase the recycled turbine exhaust's absolute pressure by a ratio range of only 2.4 to 6.4 to achieve a preferred high simple-cycle thermal efficiency, but the cycle is not limited to operations within these said ratios.

As shown in Table 1, between gas turbine fuel combustion pressures of 45 psia and 75 psia, the AES Turbine Simple Cycle thermal efficiencies portion of the cogeneration system can range between 35.16% and 43.24%. Between 75 psia and 90 psia oxy-fuel combustion chamber assembly pressures (with the common primary recycle compressor and power turbine efficiencies of 84% and stage 1 turbine inlet temperature of 1800° F.), the AES turbine cycle system portion (simple-cycle) efficiencies begins to decline.

TABLE 1

| Combustion Operating Pressure | Gas Turbine Gas Inlet Temperature | Gas Turbine Exhaust Temperature | Gas Turbine Net Output Horsepower | Gas Turbine Fuel Rate Btu/HP-Hr. | Thermal Efficiency %* |
|---|---|---|---|---|---|
| 45 psia | 1800° F. | 1471° F. | 2859 | 7237 | 35.16 |
| 60 psia | 1800° F. | 1391° F. | 3458 | 5983 | 42.54 |
| 75 psia | 1800° F. | 1331° F. | 3515 | 5885 | 43.24 |
| 90 psia | 1800° F. | 1284° F. | 3406 | 6075 | 41.89 |

*With a 1 Mol/minute methane gas fuel rate

The re-cycled and re-pressurized turbine exhaust gas (that hereafter may be referred to as "primary re-pressurized recycle gas") is discharged from the primary recycle compressor at an increased temperature and pressure through a conduit manifold containing both a side-branch connection and first and second parallel conduit end-branches flow-controlled streams. The conduit manifold side-branch supplied controlled low mass flow stream of primary re-pressurized recycle gas can be reduced in temperature within an air-cooled exchanger prior to the stream flow's entry into one or more preferred partial premixer subassembly contained within each oxy-fuel combustion chamber assembly. Within each referred partial premixer subassembly, the primary re-pressurized recycle gas stream can be homogenously pre-mix blended with the supply stream of predominant oxygen that is also is also supplied to the preferred partial premixer subassembly and/or the supply stream of fuel.

The cited first and second parallel conduit end-branches flow-controlled streams having end-connectivity respectively to the inlets of first and second headers of the power turbine exhaust gas waste heat recovery unit (WHRU) exchanger of counter-current flow gas to gas heat exchange design. A predominate flow-controlled portion of the hot gas expansion power turbine's developed high temperature exhaust is flow-directed through this WHRU exchanger for its heat transfer into the primary recycle gas stream that thereafter is downstream re-admitted into the oxy-fuel fired combustion chamber assembly.

This hot gas expansion power turbine exhaust gas WHRU exchanger can be capable, with the particular example of a methane fuel combustion chamber pressure of 60 psi absolute and 1800° F. first stage power turbine inlet temperature, of raising the temperature of the primary re-pressurized recycle gas within the turbine exhaust gas WHRU exchanger to an approximate maximum 1350° F. temperature. With these operating conditions and assumed compressor and hot gas expansion turbine efficiencies of 84%, a desired simple-cycle turbine thermal efficiency of 42.5% can be achieved.

Thereafter, the 1350° F. highly superheated and re-pressurized primary recycle gas individual streams are referred to as "working motive fluid". The first controlled stream of working motive fluid can be routed and separately flow-divided as required to the internal tertiary blending zone contained within each of one or more oxy-fuel fired combustion chamber assembly that can be positioned radially about the centerline axis of the power turbine unit assembly. The second controlled stream can be separately flow-divided as required for passage into one or more preferred partial premixer sub-assemblies contained within one or more oxy-fuel fired combustion chamber assembly.

Within the presented power cogeneration system, a lesser flow controlled portion of the total power turbine exhaust flows through the waste heat recovery steam generator (that hereafter may be referred to as WHRSG) exchanger or waste heat recovery process fluid (that hereafter may be referred to as WHRPF) exchanger.

Second Embodiment

From the First Embodiment's "the re-circulated turbine exhaust gas is routed from a exhaust gas distribution manifold containing exhaust gas having a small degree of superheat temperature and positive gage pressure supply with connectivity to the inlet of the primary recycle compressor", the cited re-circulated turbine gas within the exhaust distribution manifold comprises the discharge exhaust gas from a second WHRSG or WHRPF exchanger upstream connected to a re-circulated exhaust gas manifold that conveys the combined turbine reduced temperature exhaust gases from both the WHRU exchanger and the first parallel-positioned WHRSG or WHRPF exchanger into which the total gas turbine high temperature exhaust is first inlet-connected.

Either the second WHRSG or second WHRPF exchanger can perform the initial heating of supplied streams from either a facility's steam or hot water feed circuit or a process fluid stream prior to either of these streams being further downstream flow-connected to the fore-described high temperature turbine exhaust gases first WHRSG exchanger or WHRPF exchanger.

Third Embodiment

From the First Embodiment cited re-circulated turbine exhaust from the exhaust gas distribution manifold supplied to the inlet of the primary recycle compressor, the exhaust gas distribution manifold has a end manifold alternative system connection point and two side-branch flow delivery connections. The first side-branch conduit provides the greatly predominant flow of re-circulated exhaust gases into the inlet of the recycle compressor, and the second side-branch conduit directs the controlled flow of excess re-circulated turbine exhaust gases to atmosphere during steady-state operation of the presented system. This flow of excess re-circulated turbine exhaust gases to atmosphere constitutes the "Open Portion" of the presented partial-open power cogeneration system. The system steady-state condition's controlled mass flow rate in which the excess re-circulated turbine exhaust is vented to atmosphere is equivalent to the combined mass rates at which the fuel and the predominant oxygen gas streams enter the invention's provided oxy-fuel combustion system and apparatus means.

Fourth Embodiment

From the First Embodiment cited "The second controlled stream can be separately flow-divided as required for passage into one or more preferred partial premixer sub-assemblies contained within one or more oxy-fuel combustion chamber assembly", each partial premixer sub-assembly having the following introduced controlled streams: fuel; a predominant oxygen stream which originates from an adjacent facility area containing a preferred highly electric energy efficient modular air separation system; First Embodiment described air-cooled primary re-pressurized recycle gas; and second stream of working motive fluid. These individual flow controlled conduit streams at differential pressures and velocities are collectively admitted through their respective partial premixer inlet conduit means for preferred selective pre-mixing and homogeneous blending at points of admittance into the primary combustion zone within each oxy-fuel combustion chamber assembly. The cited specific individual gaseous stream mass flows, temperatures and pressures entering the invention's combustion chamber assembly are provided in Table 2 in the following 'Detailed Description of the Preferred Embodiment'.

Fifth Embodiment

From the First Embodiment cited "The first controlled stream of working motive fluid can be routed and separately flow-divided as required to the internal tertiary blending zone contained within each of one or more oxy-fuel combustion burner assembly that can be positioned radially about the centerline axis of the power turbine assembly", the first controlled stream of working motive fluid supplied to the tertiary blending zone flow can be first introduced into an oxy-fuel combustion chamber assembly's inner annulus area between the combustion chamber assembly's outer casing and a current art style inner liner surrounding each tertiary blending zone within each combustion chamber assembly. This tertiary zone introduced mass flow of superheated working motive fluid of example 1350° F. temperature blends therein with the example maximum 2400° F. resultant temperature combined gases emanating from the combustion chamber assembly's primary combustion zone, the combined gases thereby producing a resultant example 1800° F. final oxy-fuel combustion chamber assembly exhaust flow temperature connecting to the hot gas expansion turbine assembly. The blended temperature of the final oxy-fuel combustion chamber assembly exhaust gases is not limited to 1800° F., and can be controlled by the tertiary zone's cited introduced first stream's working motive fluid mass flow rate to establish any other higher or lower selected operating temperature. The example 1800° F. temperature can be chosen to coincide with 10 year old proven power turbine blade metallurgy technology for continuous operation.

Within the one or more hot gas expansion turbine stages, the oxy-fuel combustion chamber assembly's pressurized and highly superheated gases are expanded to create useful work in the established form of both turbine output shaft horsepower and (in the case of a current art gas turbine unit configuration) internal horsepower to additionally direct-drive the primary recycle gas compressor. In a current art 2-shaft style of gas turbine, the primary recycle gas compressor is shaft-connected to the high-pressure stage section of the hot gas expansion power turbine assembly, and the low pressure section of the hot gas expansion power turbine assembly provides the turbine power output power to driven equipment. The expanded exhaust gases exit the hot gas expansion power turbine assembly at a low positive gage pressure and are further conveyed through conduit means to the fore-described WHRU exchanger and adjacent parallel-position WHRSG or WHRPF exchanger as further described later and shown in FIG. 1.

Sixth Embodiment

In the Fifth Embodiment description "In a conventional 2-shaft style of gas turbine, the primary recycle compressor is shaft-connected to the high-pressure stage section of the hot gas expansion power turbine assembly, and the low pressure section of the hot gas expansion power turbine assembly provides the turbine power output power to driven equipment.", the presented invention provides alternative system and apparatus means by which an unconventional configured turbine power train comprising; individual separate compressor unit assembly, oxy-fuel combustion heater-burner assembly, and a hot gas expansion turbine assembly unit with mechanical shaft output can be configured to produce mechanical or electrical power within a cogeneration system as described later and shown in FIG. 2.

The invention's alternative primary recycle compressor can be a separately motor-driven or stream turbine-driven compressor of centrifugal or axial type therein comprising one or more stages of compression as required, or a single rotating positive displacement type for the system applied operating conditions. The re-circulated and slightly super-heated turbine exhaust gas stream is re-introduced into the primary recycle gas compressor and increased in pressure and temperature as described for the current art gas turbine power system. This style of primary recycle gas compression drive train generally offers greatly improved capacity control and/or turn-down capabilities, but can be overall less efficient than the conventional gas turbine assembly's direct-driven axial compressor section.

As described in the Fourth and Fifth Embodiment, the oxy-fuel combustion chamber assembly configuration and functional operation remains unchanged. Rather than the Fifth Embodiment described one or more oxy-fuel combustion chamber assembly being positioned radially about the centerline axis of the power turbine assembly, the presented invention's alternative system and apparatus means can further have a single oxy-fuel fired combustion heater-burner assembly that is axially centerline-positioned and can be directed-connected to the hot gas expander power turbine as shown later in FIG. 2. A single oxy-fuel combustion heater-burner chamber assembly can comprise multiple elements of existing manufactured oxy-fuel heater-burner combustor models rated from 0.6 to 14 MM Btu/Hr. as typically employed in the glass and steel making industries, or can comprise modifications to existing single industrial steam generation or process heater burner configurations that can be rated between 25 to 500 MM Btu/Hr.

Seventh Embodiment

From the Second Embodiment's cited " . . . , the cited re-circulated turbine gas within the exhaust distribution manifold comprises the discharge exhaust gas from a second WHRSG or WHRPF exchanger upstream connected to a re-circulated exhaust gas manifold that conveys the combined turbine reduced temperature exhaust gases from both the WHRU exchanger and the first parallel-positioned WHRSG or WHRPF exchanger into which the gas turbine high temperature exhaust is first inlet-connected.", the total amount of waste heat that can usefully be transferred into the cited heat exchangers' supplied fluids is limited to or in proportion to the amount of turbine output power that is developed by the invention's power cogeneration system turbine unit.

The presented invention provides alternative system and apparatus means by which a power turbine cogeneration system's production of steam or water (or heating of process fluids) is independent of the amount of turbine developed power within a cogeneration system. This presented invention, with its described alternative system and apparatus means, provides this cogeneration system with added operational flexibility while further increasing the thermal efficiency of the presented invention's cogeneration system and maintaining the same ultra-low exhaust emissions. Wherein a presented cogeneration system facility of a given power output rating could fully utilize a 100% or greater steam production or process fluid heating than would be associated with the cogeneration system and apparatus means shown in FIG. 1, the FIG. 2 presented alternative cogeneration system and apparatus means can include the presented supplementary oxy-fuel fired heating of recycled system exhaust gases to achieve the additional production of steam or process fluid heating while achieving the presented overall cogeneration system thermal efficiencies that can significantly exceed 115% as shown later in Table 5 for an example 100% increase in steam or process heating beyond the FIG. 1 system capabilities.

The presented invention's alternative system and apparatus means includes the added conduit means for withdrawal of re-circulated turbine exhaust gas from the Third Embodiment described exhaust gas distribution manifold for the conduit routed supply of the re-circulated turbine exhaust gas to the example FIG. 2 preferred two parallel auxiliary primary recycle blowers. The blowers can be separately capacity controlled to produce slightly re-pressurized first and second conduit stream flows of exhaust recycled gas that are connected to the alternative cogeneration system's auxiliary oxy-fuel combustion heater-burner assembly unit. The oxy-fuel combustion heater-burner assembly employs additional individual connected flow controlled streams of fuel and predominant oxygen to produce an identical composition of combustion exhaust gases as existing within the turbine exhaust gases, whereby the cited added oxy-fuel combustion heater-burner assembly's exhaust gases are conduit routed into the turbine exhaust conduit branch connecting to the WHRSG exchanger or WHRPG exchanger described above in the above cited Second Embodiment text.

In the case of the FIG. 1 configuration of the presented invention's cogeneration system and apparatus means, any increase in power generation (beyond the then existing cogeneration system's 'steady-state' production condition, but not exceeding the turbine's continuous rating) can be accomplished by terminating the controlled flow of vented excess turbine re-circulated exhaust flow to atmosphere and increasing fuel and predominant oxygen flow. Only upon reaching the required accumulated increased mass flow of preset high temperature exhaust gases within the closed system, is the presented invention's power cogeneration system then returned to its normal 'steady-state' and 'partially-open system status' with controlled excess re-circulated exhaust gas vented to atmosphere.

Eighth Embodiment

From the First Embodiment cited "As shown in Table 1, between a power turbine oxy-fuel combustion chamber assembly pressures of 45 psia and 75 psia, the AES turbine Simple Cycle thermal efficiencies can range between 35.16% and 43.24%", the invention's improved high thermal efficient cogeneration system's presented example of a 60 psia oxy-fuel combustion burner assembly can enable a low fuel gas supply pressure of less than 65 psi gage (5.5 Bar) to be employed.

Ninth Embodiment

From the preceding collective Embodiments' cited control of fluid stream flows, temperatures, pressures, generated power, and apparatus means including valves, compressors, blowers, motors, etc., the presented invention's cogeneration system and apparatus means can be both performance and safety monitored and controlled by a manufacturer's PLC based control panel design.

Overall System and Apparatus Means

Within the presented partially-open turbine power cogeneration system and apparatus means described herein, the provided system employed oxy-fuel combustion generated working motive fluid means can provide a 95 to 100% reduction of $NO_x$ that occurs within current art Low-$NO_x$ gas turbines.

The provided partially-open turbine power cogeneration system's temperature controlled oxy-fuel combustion temperature and the speed of completed combustion heat transfer also similarly suppresses the chemical reaction dissociation formation of the fugitive emission CO from $CO_2$. The means of suppressing the development of fugitive emissions results from the following collective working motive fluid molecular attributes and combustion events:

(a) The working motive fluid of this invention's power cogeneration system comprises a continuous superheated mixture of predominant carbon dioxide and water vapor in identical Mol percent ratio proportions as these molecular components are produced from the combustion of a gaseous or liquid hydrocarbon fuel. For example, in the case of landfill gas, the working gas fluid contains a 1:1 ratio of 2 Mol carbon dioxide to 2 Mols water vapor in identical proportion to the products of stoichiometric oxygen combustion. The chemical reaction equation can be described as follows:

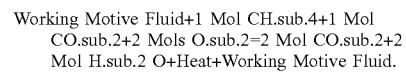

Working Motive Fluid+1 Mol $CH_4$+1 Mol $CO_2$+2 Mols $O_2$=2 Mol $CO_2$+2 Mol $H_2O$+Heat+Working Motive Fluid.

In the example of methane gas fuels, the working fluid composition contains a ratio of 1 Mol $CO_2$ to 2 Mols $H_2O$ in identical proportion to the products of 105% stoichiometric oxygen combustion of methane fuel within the chemical reaction equation of:

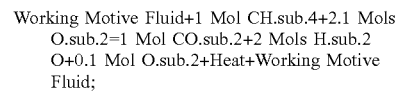

Working Motive Fluid+1 Mol $CH_4$+2.1 Mols $O_2$=1 Mol $CO_2$+2 Mols $H_2O$+0.1 Mol $O_2$+Heat+Working Motive Fluid;

(b) The invention's turbine power cogeneration system's working fluid provides the replacement mass flow means to the conventional open Brayton simple cycle's predominant diatomic non-emissive and non-radiant energy absorbing molecular nitrogen working fluid. The invention's replacement working motive fluid contains both predominant water vapor (with a binary lack of molecular symmetry) and a mass ratio of atomic weights of (16/2)=8 and carbon dioxide with a mass ratio of atomic weights of (32/12)=2.66, which denotes their susceptibility to high radiant energy emissivity and absorption. This compares to the nitrogen's mass ratio 14/14=1 which denotes nitrogen's minimal, if any, emissive and radiant energy absorbing abilities at any temperature;

(c) The invention's turbine power cycle system's controlled flow of working motive fluid provides the means for the turbine fuel combustion chamber environment to have a 900% increase of binary molecular mass means susceptible to the rapid heat transfer from the binary gaseous products of fuel/oxidation exothermic chemical reactions, the rapid heat transfer therein being predominantly radiantly transferred at the speed of light (186,000 miles a second). This enables the absorption and emissive radiant heat transfers of the fuels' combustion product's highly superheated binary carbon dioxide and binary water vapor molecules' heat energy that is emitted and adsorbed in their individual infrared spectral ranges. The radiant heat is transferred by radiant energy absorption into the combined greater mass identical proportions of identical composition gases contained within the lesser temperature second stream of working motive fluid gases supplied to the primary combustion zone contained within the combustion chamber assembly. The extremely rapid rate at which the combustion product gases are lowered in temperature within the primary combustion zone, means there is inadequate time for the chemical disassociation reactions to occur which therein produce carbon monoxide, or other chemical reactions which therein produce nitrogen oxides in the presence of the highly elevated gas molecular temperatures above 2600° F. to 2900° F.;

(d) The First Embodiment recited oxy-fuel combustion chamber assembly premixer sub-assemblies provides the means for homogeneous blending, wherein gaseous streams of fuel, re-pressurized and cooled recycle gas and predominant oxygen can be homogeneously blended for downstream mixing and ignition with the gaseous fuel stream. The gaseous fuel stream also comprises binary molecules of high susceptibility to high radiant energy absorption and emissivity, such as methane with a mass ratio of atomic weights of (16/4)=4, ethane with a mass ratio of atomic weights of (24/4)=6, propane with a mass ratio of atomic weights of (36/8)=4.5, etc;

(e) The subsequent tertiary zone admission of a described a first stream of greater mass controlled-flow of Table 2 identified 1350° F. superheated working motive fluid into the example combustion chamber's tertiary zone, the tertiary zone additionally receiving a lesser mass flow of 2400° F. primary combustion zone gases, results in the rapid establishment of the example desired resultant blended temperature of 1800° F. This rapid establishment of the preferred tertiary zone exhaust temperature of 1800° F. is due to the 186,000 miles per second rate of radiant heat transfer between the two streams of common binary molecular constituents with common means of high radiant energy absorption and emissivity in their respective individual infra-red spectrum ranges.

The presented cogeneration power system's oxy-fuel combustion system's generated working motive fluid of optimum selected operating pressures and temperatures can achieve 115% or greater cogeneration system thermal efficiencies. The means of achieving these 40% to 50% increased thermal efficiencies over that of current art conventional cogeneration power facilities (thereby reducing $CO_2$ "greenhouse mass flow emissions" by 30% to 33%), results from the following collective working fluid molecular attributes, system design, and apparatus features:

(a) The oxy-fuel combustion chamber assembly's low operating pressures reduces the work (per pound of primary re-pressurized recycled gas) that is adsorbed by the turbine train's compressor section that re-pressurizes the recycled gas stream that becomes the downstream highly superheated working motive fluid that is expanded through the hot gas expansion turbine assembly;

(b) The presented power cogeneration system working motive fluid molecular gas composition replaces air content nitrogen that is the predominant mass flow component in the conventional current art gas turbine working motive fluid. The presented cogeneration system working motive fluid is unique in that each highly superheated temperature pound of fluid can adsorb or exchange 42% more heat per degree Fahrenheit change in gas temperature than does air or nitrogen.

(c) In the presented example operating conditions, approximately 92% of the high temperature turbine exhaust heat energy that is recovered from within the total exhaust flow passing through the WHRU exchanger and first WHRSG exchanger (or WHRPF exchanger) is transferred back into the low pressure working motive fluid that will re-enter the oxy-fuel combustion burner assembly to further contribute to and to absorb the heat of fuel combustion during the invention's following "cycle" of operation.

(d) Approximately 92 to 95% of the presented cogeneration system's re-circulated exhaust downstream of the waste heat exhaust exchangers (therein containing a large 'heat sink' quantity of energy) can be recycled within the closed portion of the cogeneration system during steady-state operation. During an increased energy output demand on the presented power cogeneration system, 100% of the presented cogeneration system's re-circulated exhaust heat capacity downstream of the waste heat exhaust exchangers is recycled during its accompanying 'total-closed' cycle system operation.

With the presented partially-open turbine cycle power cogeneration system and apparatus means described herein, or presented alternative system and apparatus means, either a modified current art gas turbine unit power train or an unconventional current turbine power train can be employed. An alternative AES turbine cycle assembly unit apparatus configuration can utilize separate existing low cost mechanical equipment components and combustion chamber assemblies which are predominantly not designed for, nor applied to, the manufacture of current art gas turbines, nor the cited components' incorporation into facility designs of current technology gas turbine power cogeneration systems.

Within the presented partially-open turbine cycle power cogeneration system and apparatus means described herein, the presented invention provides alternative system and apparatus means by which a turbine cogeneration system's production of steam or water (or heating of process fluids) can be independent of the actual percentage of rated electric power load that is being produced from an operating turbine powered cogeneration system. The presented alternative system and apparatus means is not limited in its ability to have expanded steam or hot water or process heating capacity means beyond that which is possible solely from turbine exhaust waste heat utilization.

Within the presented partially-open turbine cycle power cogeneration system and apparatus means described herein, the systems and apparatus means are provided wherein all fluid streams entering the oxy-fuel fuel combustion burner assembly are controlled to maintain preset maximum primary combustion zone temperatures in which a non-distribution quality of gaseous hydrocarbon fuel (containing toxic and/or difficult to combust hydrocarbon molecular gases) can be rapidly carried through oxy-fuel combustion to a useful heat conversion and/or completed incineration without altering the system's high thermal efficiencies or ultra-low emission levels.

DETAILED DESCRIPTION OF THE PREFERRED EMBODIMENT

Figure 1:
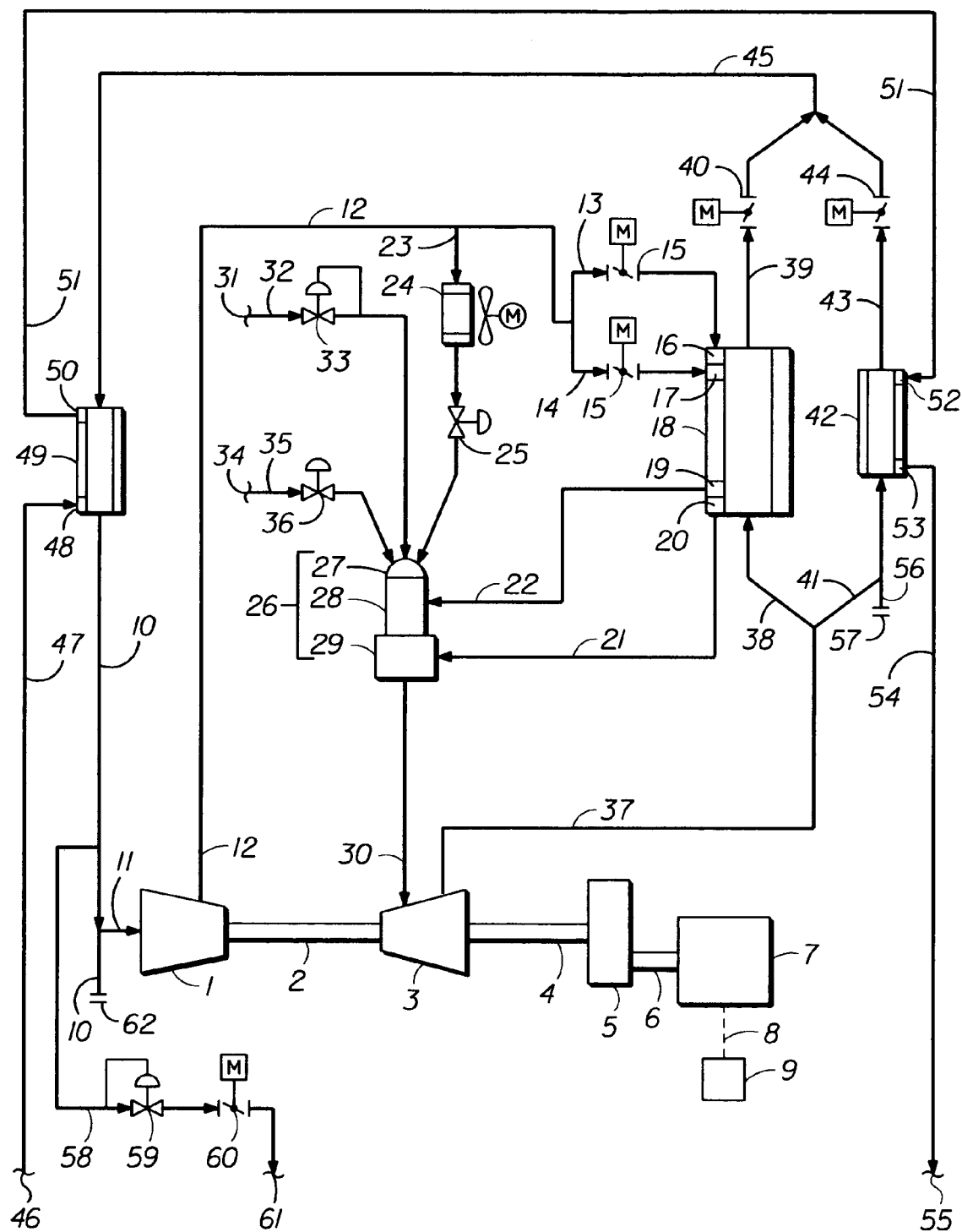
FIG. 1 is a schematic flow diagram of the invention's improved cogeneration system and apparatus that includes the AES partially-open turbine power cycle with a modified configuration of a current art gas turbine and simplified waste heat transfer for steam generation or process fluid heating.

Referring now more particularly to FIG. 1, a modified current art gas turbine's exhaust recycle gas compressor section 1 comprises two or more recycled exhaust gas compression stages, positioned in series, with a final stage of radially directed discharge flow of compressed recycle exhaust gas. In the case of a two-shaft turbine, the power to drive the recycle compressor section 1 is transmitted by shaft 2, on which one or more high-pressure power extraction turbine stages are mounted within the hot gas expander power turbine assembly 3. The second shaft, designed for mechanical equipment or generator drive applications, has one or more low-pressure hot gas expansion stages mounted on power output shaft 4, with coupling means (not shown) for power transmission to rotate the driven equipment.

The invention's cycle adaptation to current art gas turbine driven mechanical equipment may or may not require the addition of a gearbox or variable speed coupling 5 to adapt the speed of the hot gas expansion power turbine 3 to the speed required by a generator or other driven equipment (not shown). The rotating driven equipment may have its required power transmitted through a shaft and coupling means 6. The shaft and coupling means 6 can transmit power to a generator 7, wherein electric power is produced and transmitted through conduit means 8 to a control room module 9. Control room module 9 therein contains the modular turbine unit's PLC control panel and switchgear and motor control center, whereby electric power production is controlled and distributed to the power facility's electrical grid and/or connected electric utility electrical grid. The shaft and coupling means 6 may alternately transmit power to other rotating pumps or compressors in lieu of generator 7.

Within the presented invention's partially-open power cogeneration system, the slightly superheated turbine exhaust re-circulated gas flows from the turbine exhaust gas distribution manifold 10 (having end-connection 62 that is blind-flanged closed in this FIG. 1) through said manifold side-branch connected turbine exhaust recycle gas conduit means 11 that is end-connected to the inlet of the turbine exhaust gas primary recycle compressor section 1. The higher-pressure and higher-temperature compressed recycle turbine exhaust gas (hereafter referred to as "primary re-pressurized recycle gas") is routed through conduit manifold 12 containing two parallel conduit end-branches 13 and 14 respectively, each said branch containing a gas mass flow sensor means and a flow control (or flow proportioning) damper valve 15.

The twin conduit end-branches 13 and 14 respectively convey first and second primary re-pressurized recycle gas streams with respective end connections to parallel inlet headers 16 and 17 located on the primary section 18 of the power turbine exhaust gas WHRU exchanger. The said first and second streams of primary re-pressurized recycle gas are discharged from primary section 18 of the power turbine exhaust gas waste heat recovery unit (WHRU) exchanger through outlet headers 20 and 19 respectively at highly increased superheated temperatures (with the highly superheated recycle gas hereinafter referred to as a "working motive fluid") with flows through conduits 21 and 22 respectively.

The primary re-pressurized recycle gas is additionally routed at low gas flow levels from conduit manifold means 12 through a side-branch connected conduit means 23 containing motor driven air-cooler 24 and flow control valve 25 for subsequent downstream conduit end-connection to one or more partial premixer sub-assemblies 27 contained within one or more oxy-fuel combustion burner assembly 26 that can be positioned radially about the centerline axis of the power turbine assembly.

Conduit 22 conveys the second controlled stream of working motive fluid to the internal primary combustion zone 28 contained within each oxy-fuel combustion chamber assembly 26. Conduit 21 conveys the first controlled stream of working motive fluid to the internal tertiary blending zone 29 contained within each oxy-fuel combustion chamber assembly 26 that can be positioned radially about the centerline axis of the turbine assembly. The combined streams of working motive fluid composition gases exiting tertiary blending zone 29 can be routed through conduit flow means 30 having end connection to the inlet of hot gas expander power turbine assembly 3.

Alternately, the conduit 21 can convey the first controlled stream of working motive fluid to a common single tertiary blending zone that receives primary combustion zone working fluid composition gases from two or more oxy-fuel fired combustion chamber assembly 26 that is positioned immediately upstream of the described alternate single common (not shown) tertiary blending zone. The combined streams of working motive fluid composition gases exiting the common tertiary blending zone (not shown) are routed through conduit 30 having end connection to the inlet of hot gas expander power turbine assembly 3.

A pressurized stream of presented example methane fuel gas (or alternate acceptable liquid hydrocarbon fuel) is supplied from source 31 into conduit 32 containing sensor-transmitter means for temperature, pressure, mass flow, and fuel flow control valve means 33, with said conduit having end-connectivity to either one or more preferred downstream partial premixer subassembly 27 contained within oxy-fuel combustion chamber assembly 26.

A controlled pressurized stream of predominant oxygen is supplied from a facility remote source 34 into conduit 35 containing sensor-transmitter means for temperature, pressure, mass flow, and flow control valve means 36, with said conduit having end-connectivity to either one or more preferred partial premixer subassembly 27 contained within oxy-fuel combustion chamber assembly 26.

Within the partial premixer subassembly 27, the said identified conduits 23, 32, and 35 respectively supplied controlled stream flows of primary re-pressurized recycle gas, fuel, and predominant oxygen are therein partially blended therein for following downstream ignition and controlled temperature combustion within the temperature sensor-transmitter monitored primary combustion zone 28 therein having further admitted second controlled stream of working motive fluid composition gases supplied by conduit 22.

Within oxy-fuel fired combustion chamber assembly 26, the combined mass flows of products of fuel combustion and streams of working motive fluid composition gases flows from the primary combustion zone 28 at a controlled highly superheated presented example resultant temperature of 2400 F into the downstream positioned tertiary blending zone 29 wherein these said gases are blended with the controlled mass flow of fore-described conduit 21 supplied first stream of working motive fluid composition gases.

The combined working motive fluid composition gases' mass flows entering the tertiary blending zone 29 within oxy-fuel fired combustion chamber assembly 26 therein produces a resultant selected temperature and mass flow rate of superheated gases discharged through conduit 30 into the hot gas expander power turbine subassembly 3. Work is developed within the hot gas expander power turbine subassembly 3, and the heat energy or enthalpy (Btu/lb) contained within the mass flow of expanded exhausted gases is decreased and discharged into conduit 37. Conduit 37 routes the hot gas expander power turbine exhaust gases through conduit end-branches 38 and 41 that are respectively connected to WHRU exchanger 18 and waste heat recovery steam generator (WHRSG) or waste heat recovery process fluid heater (WHRPF) exchanger 42. The proportional division of the total mass flow of the hot gas expander power turbine subassembly 3 exhaust gas contained within conduit 37, between conduit end-branches 38 and 41, is controlled or flow-proportioned respectively by damper valves 40 and 44 contained within the WHRU exchanger 18 and WHRSG or WHRPF exchanger 42 respective outlet exhaust branch conduits 39 and 43. The predominant portion of conduit 37's total mass flow of exhaust gases is divided and directed through WHRU exchanger 18 to satisfy the exhaust heat transfer requirements to the primary re-pressurized recycled gas flowing through exchanger 18. In the case of waste heat transfer to a facility's supplied hot water/steam or process fluid circuit, a pressurized stream of a cogeneration facility's steam condensate feed water (or process fluid) can be supplied from source 46 into conduit 47 that can contain sensor-transmitter means for both temperature and mass flow, and having end-connectivity to the inlet header 48 of a second (WHRSG) or WHRPF exchanger 49. In the case of stream generation, the supplied stream of steam condensate can be changed from a liquid phase to a liquid/vapor 2-phase state or slight superheated steam vapor state within exchanger 49, and exits from exchanger 49 through discharge header 50 into conduit 51 having end-connectivity to the inlet header 52 of WHRSG exchanger 42. Within WHRSG exchanger 42, the steam circuit stream can be highly superheated as desired to a cogeneration system produced steam superheat temperature ranging from less than 900° F. to over 1200° F. for discharge from outlet header 53 into conduit 54 that can deliver the superheated steam to a facility delivery connection point 55. For the alternative addition of increased cogeneration system mass flow steam generation (as described later in FIG. 2), hot gas expander turbine exhaust gas conduit 37's end-branch conduit 41 can be supplied with a connected side-branch conduct 56 whose end connection 57 that is closed with a blind-flange in FIG. 1.

The cogeneration system's reduced temperature exhaust gases exits from the WHRU exchanger 18 and the parallel-positioned WHRSG exchanger or WHRPF exchanger 42 through their respective exhaust gas discharge branch conduits 39 and 43, each branch conduit respectively therein containing controlled-flow damper valves 40 and 44. The reduced temperature system exhaust gas flows from branch conduits 40 and 44 are combined within re-circulated exhaust gas manifold 45 having end-connectivity to a downstream-positioned second WHRSG exchanger or WHRPF exchanger 49. The system's re-circulated exhaust gases are reduced in temperature within the second WHRSG exchanger or WHRPF exchanger 49 to a temperature that is slightly above the dew point temperature of the re-circulated exhaust gas as it is discharged from the heat exchanger 49 into the exhaust gas distribution manifold 10.

Within the presented invention's partially-open cogeneration power system, the slightly superheated turbine re-circulated exhaust gas mass flow within exhaust gas distribution manifold 10 remains at a constant flow rate for steady-state cogeneration system operation. The excess slightly superheated turbine re-circulated exhaust gas mass flow within manifold 10 that is not required for steady-state turbine power production is flow-directed from manifold 10 through side-branch conduit 58 therein containing back pressure control valve 59 and flow control valve 60 and having downstream connectivity to atmosphere at vent point 61. The terminal end of exhaust gas distribution manifold 11 is provided with a closed blind flange connection 62 in FIG. 1.

Figure 2:
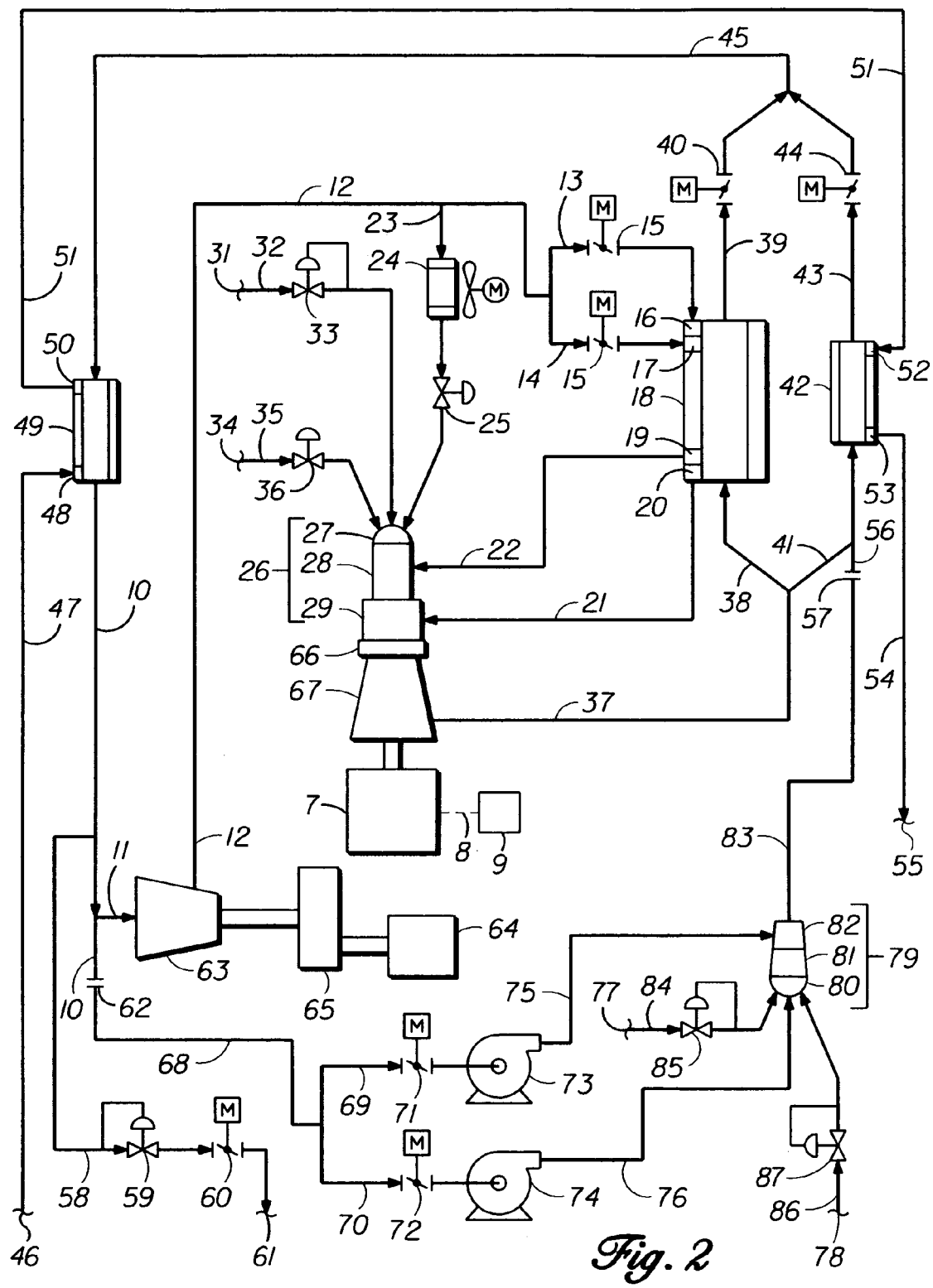
FIG. 2 is a schematic flow diagram of the invention's improved cogeneration system that includes the AES partially-open turbine power cycle system and apparatus of FIG. 1 and additional alternative apparatus means including an alternate separate motor or steam turbine driven recycle compressor, oxy-fuel combustion chamber assembly series-connected to a hot gas expander power turbine, and alternative supplementary oxy-fuel combustion heater-burner assembly that increases system steam or hot water production or heating of process fluids.

FIG. 2 is a schematic flow diagram of the invention's improved cogeneration system that shows the same presented partially-open power turbine cycle system as shown in FIG. 1 with added specifically herein described alternative apparatus means that can include both an alternate separate motor or steam turbine driven recycle compressor and oxy-fuel combustion chamber assembly that is series-connected to a separate hot gas expander turbine having power output shaft connection means. FIG. 2 further shows and describes the alternate system addition of a separate oxy-fuel combustion heater-burner assembly that performs the function of a supplementary hot exhaust gas generator to increase the cogeneration system's production of steam or the heating of process fluids.

Referring now more particularly to FIG. 2, the presented invention's improved cogeneration system therein incorporates the AES partially-open turbine cycle system and alternative apparatus means that can include an alternative separately driven primary recycle compressor comprising two or more power system recycle gas compression stages, with a final stage radially-directed discharge flow of primary re-pressurized recycle gas. Primary recycle compressor 63 can alternately be directly driven by an electric motor or steam turbine type driver 64, or indirectly-driven through either gearbox or variable speed coupling means 65.

The system's hot gas expander power turbine assembly 67 can comprise one or more power extraction turbine stages and assembly output shaft that can be directly connected to electrical generator 7 wherein electric power is produced and transmitted through conduit means 8 to a control room module 9. Control room module 9 therein contains the power cogeneration system's PLC control panel, switchgear and motor control center, whereby electric power production can be controlled and distributed to the operating facility's electrical grid and/or to the utility electrical grid. Alternately (not shown), a gearbox or variable speed coupling can be positioned between the power turbine assembly output shaft and alternative driven rotating pumps or compressors (not shown) in lieu of generator 7.

Within the presented invention's partially-open power cogeneration system of FIG. 1, the slightly superheated turbine exhaust recycle gas can flow from the turbine exhaust gas distribution manifold 10 with exiting flows through open end-connection 62 that series-connects to manifold extension conduit 68 as further described later. Manifold 10 side-branch connected turbine exhaust recycle gas conduit means 11 is end-connected to the inlet of the turbine exhaust gas primary recycle compressor 63. The higher-pressure and higher-temperature re-pressurized recycle turbine exhaust gas (hereafter referred to as "primary re-pressurized recycle gas") and related identical stream flows are thereafter the same as described as in FIG. 1 for its routing through WHRU 18 and continuing to oxy-fuel fired combustion chamber assembly 26. The hot gases generated within oxy-fuel fired combustion chamber assembly 26 are routed through direct-connected gas transition assembly 66 with end connectivity to the inlet of hot gas expander turbine assembly 67.

Conduit 37 routes the hot gas expander turbine assembly 67 exhaust gases through conduit end-branches 38 and 41 that are respectively connected to WHRU exchanger 18 and waste heat recovery steam generator (WHRSG) or process fluid heat exchanger 42 and thereafter described associated conduit streams are as described for FIG. 1. For the alternative addition of increased cogeneration system mass flow steam generation, fore-described conduit 68 can route a flow of slightly superheated turbine exhaust recycle gas through preferred parallel end-branch conduits 69 and 70 respectively containing flow control provided isolation/damper valves 71 and 72 and having end connectivity with one or more parallel-positioned 73 and 74 speed-controlled motor-driven exhaust recycle gas blowers. Exhaust recycle gas blower 73 provides a required mass flow of exhaust recycle gas at a slightly increased pressure into its discharge conduit 75 having end-connectivity with the tertiary blending zone 82 contained within the downstream-positioned oxy-fuel fired heater-burner assembly 79. Exhaust recycle gas blower 74 provides a required mass flow of exhaust recycle gas at a slightly increased pressure into its discharge conduit 76 having end-connectivity with the partial premixer subassembly 80 contained within the downstream-positioned oxy-fuel fired combustion heater-burner assembly 79.

A controlled stream of low pressure predominant oxygen is supplied from facility remote source 77 into conduit 84 containing sensor-transmitter means for temperature, pressure, mass flow, and oxygen flow control valve means 85, with said conduit 84 having end-connectivity to either one or more preferred partial premixer subassembly 80 contained within oxy-fuel fired combustion heater-burner assembly 79.

A low pressure stream of presented example methane fuel gas (or alternate acceptable liquid hydrocarbon fuel) is supplied from source 78 into conduit 86 containing sensor-transmitter means for temperature, pressure, mass flow, and fuel pressure/flow control valve means 87, with said conduit 86 having end-connectivity to either one or more downstream-positioned preferred partial premixer subassembly 80 contained within oxy-fuel fired combustion heater-burner assembly 79.

Within the partial premixer subassembly 80, the said identified conduits 76, 86, and 84 respectively supplied stream flows of turbine exhaust recycle gas, fuel, and predominant oxygen are therein blended for following downstream ignition and controlled temperature combustion within the temperature sensor-transmitter monitored primary combustion zone 81 contained within oxy-fuel fired combustion heater-burner assembly 79.

Within oxy-fuel fired combustion heater-burner assembly 79, the predominant mass flow of combined products of fuel combustion and turbine exhaust recycled gas flows from the primary combustion zone 81 (at a controlled high superheated presented example resultant temperature of 2400 F) into the downstream tertiary blending zone 82 wherein these said composition gases can be blended with the controlled mass flow of fore-described conduit 75 supplied blower discharge stream of slightly re-pressurized and low super-heated power turbine exhaust recycle gases of identical gas composition.

The oxy-fuel fired combustion heater-burner assembly 79 provides a supplementary flow of slightly re-pressurized and highly superheated turbine recycle exhaust gas mass flow at controlled temperatures into conduit 83 having end connectivity to conduit 56's flanged connection 57. The supplementary flow of slightly re-pressurized and highly superheated turbine recycle exhaust gas mass flow is routed through conduit 56 into branch conduit 41 having connectivity to WHRSG exchanger or process fluid exchanger 42, thereby enabling a increased mass flow of steam or hot water or process fluids (in conduits 47, 51, and 54 at selected desired temperature operating conditions) to be additionally generated with high system thermal efficiency within the WHRSG or process fluid exchangers 49 and 42 from the invention's increased cogeneration system's increased mass flows of superheated recycled exhaust mass flows.

Within the presented invention's partially-open power cogeneration system, the slightly superheated turbine recycle exhaust gas mass flow within conduit 11 remains at a constant flow rate for steady-state turbine power shaft horsepower output production. The excess slightly superheated turbine recycle exhaust gas mass flow within manifold 10 that is not required for steady-state turbine power production, nor is required to maintain an existing steady-state recycle exhaust gas mass flow rate within conduit 68 for the oxy-fuel combustion heater-burner assembly 79, is flow-directed from manifold 10 through side-branch conduit 58 containing back pressure control valve 59 and flow control/isolation valve 60 with downstream connectivity to atmosphere occurring at vent point 61.

The numbers in Table 2 below are representative of: one example set of fluid stream conditions in which the AES turbine power cycle portion within the presented cogeneration system can operate (the conduit streams are those identified by the numbers in FIG. 1). The following assumptions were made: both the recycle compressor efficiency and hot gas expansion turbine efficiency is 84%; the oxy-fuel combustion burner assembly operating pressure is 60 psia; and the methane fuel gas flow rate is 1 Mol/minute.

TABLE 2

| Conduit Stream Number | Stream Fluid | Temperature Degree F. | Pressure PSIA | Mass Flow lbs./Min. |
|---|---|---|---|---|
| 11 | Recycle Exhaust | 197 | 15 | 1879 |
| 12 | Compressed Recycle | 500 | 64 | 1879 |
| 22 | WMF - Primary Zone | 1350 | 63 | 686 |
| 21 | WMF - Tertiary Zone | 1350 | 63 | 1153 |
| 23 | Cooled Compressed Recycle | 280 | 63.5 | 40 |
| 32 | Methane Fuel | 70 | 85 | 16 |
| 35 | Predominant $O_2$ | 110 | 65 | 64 |
| 30 | Combustion Gas | 1800 | 60 | 1959 |
| 37 | Turbine Exhaust | 1391 | 15.8 | 1959 |
| 45 | WHRU & WHRSG Exhaust | 530 | 15.4 | 1959 |
| 58 | Cogen System Vent Gas | 197 | 15.1 | 81 |

(WMF) = Working Motive Fluid

With the same example stream conditions and assumptions made for Table 2, supra, Table 3 provides the thermodynamic values from which the tabulated compressor horsepowers and turbine power outputs are derived.

TABLE 3

| Conduit Stream** Number | Rotating Equipment Name | Stream Fluid | Temperature Degrees F. | Mass Flow lbs./Min. | Delta Enthalpy Btu/Lb. | Horse-Power (HP) |
|---|---|---|---|---|---|---|
| 11 to 12 | Exhaust Recycle Compressor | Inlet Discharge | 197 500 | 1879 | 98.9 | 4377 |
| 30 to 37 | Hot Gas Expander Turbine | Inlet Discharge | 1800 1391 | 1959 | 169.7 | 7837 |
| | Net Shaft Horsepower Output | | | | | 3460 SHP* |

*Note: (20,693,400 LHV Btu/Hr-Mol CH4) ÷ 3460 SHP = 5980 Btu/Hp-hr. fuel rate.
*Note: Fuel Rate: (2545 Bt/Hp-hr. ÷ 5980 Btu/Hp-Hr. = 42.55% turbine engine thermal efficiency:
**Note: Only the conduit stream numbers reference to both FIG. 1 and FIG. 2 drawings.

With the same conditions and assumptions made for Table 2, supra, Table 4 contains six conduit streams (as noted) that appear in both FIG. 1 and FIG. 2, with the thermal heat transfers and mass flow rates pertaining only to the FIG. 1 presented system.

TABLE 4

| Conduit Stream Number | Heat Exchanger Name | Stream Fluid | Temperature Change Degrees F. | Mass Flow lbs./Min. | Delta Enthalpy Btu/Lb. | Recovered Heat Rate Btu/Min. |
|---|---|---|---|---|---|---|
| 37 to 45 | 18 + 42 | Total Exhaust | 1391 F. to 530 F. | 1959 | 326 | 638,634 |
| 38 to 39 | WHRU 18 | Exhaust Gas | 1391 F. to 530 F. | 1805.15 | 326 | 588,480 |
| 13/14–21/22 | WHRU 18 | 'WMF' Gas | 500 F. to 1350 F. | 1839 | 320 | 588,480 |
| 41 to 43 | WHRSG 42 | Exhaust | 1391 F. to 530 F. | 153.85 | 326 | 50,154* |
| 45 to 10 | WHRSG 49 | Exhaust | 530 F. to 197 F. | 1959 | 110 | 215,490* |

*Total Available Heat for Process Gas or Steam Circuit = (215,490 + 50,154) = 265,644 Btu/Min.
*Total Available Heat for Process Gas or Steam Circuit = (215,490 + 50,154) = 15,938,640 Btu/Hr.
Total 910 Btu/SCF LHV of 1 Mol/Min. Methane Fuel Gas = 344,890 Btu/Min. = 20,693,400 Btu/Hr.
Recovered Heat Rate from the Supplied Fuel Gas Energy: = (15,938,640 Btu/Hr ÷ 20,693,400 LHV Btu/Hr-Mol Methane Gas) = 77.02%.
Total Cogeneration System Thermal Efficiency: = 42.5% Simple Cycle Turbine + 77.02% Recovered Heat = 119.5%.

With the same conditions and assumptions made for Table 2 and 4 supra, Table 5 provides the thermal heat transfers and mass flow rates as contained the Alternative Cogeneration System of FIG. 2 with added supplementary heat blended into the turbine exhaust stream to increase the cogeneration system's effective transfer of heat to steam or process heated fluids by the example amount of 100%.

TABLE 5

| Conduit Stream Number | Heat Exchanger Name | Stream Gas | Temperature Change Degrees F. | Mass Flow lbs./Min. | Delta Enthalpy Btu/Lb. | Recovered Heat Rate Btu/Min. |
|---|---|---|---|---|---|---|
| 38 to 39 | WHRU 18 | Turbine Exh. | 1391 F. to 530 F. | 1805 | 326 | 588,480 |
| 13/14–21/22 | WHRU 18 | 'WMF' Gas | 500 F. to 1350 F. | 1839 | 320 | 588,480 |
| 41/83–43 | WHRSG 42 | Exhaust | 1391 F. to 530 F. | 763 | 326 | 248,738* |
| 45 to 10 | WHRSG 49 | Exhaust | 530 F. to 197 F. | 2568 | 110 | 282,480* |
| 10 to 11 | | Recycle | | 1879 | | |
| 10 to 68 | | Recycle | 197 F. | 556 | | |
| 10 to 61 | | Exhaust Vent | | 138 | | |
| 35 + 84 | | 95% Oxygen Mixture | 120 F. | 112 | | |
| 32 + 86 | | Methane Fuel | 70 F. | 26 | | |

*Total Available Effective Energy Conversion to Heat for Process Gas or Water/Steam Circuit: = (248,738 + 282,480) = 531,218 Btu/Min. = 31,873,080 Btu/Hr.
Turbine Power Apparatus Effective Energy Conversion Rate = (2545) × (3460 SHP) = 8,805,700 Btu/Hr.
Total Effective Energy Conversion Rate = 40,678,780 Btu/Hr.
Total System Fuel Energy Consumption: (20,693,400 LHv Btu/Hr. for Turbine Apparatus + 12,993,602 LHV Btu/Hr for Supplementary AES Burner System) = 33,687,002 LHV Btu/Hr.
Overall System Thermal Efficiency: (40,678,780 Btu/Hr.) ÷ (33,687,002) = 120.75%

It should be understood that the forgoing description is only illustrative of the invention. Various system and apparatus alternatives, fuels, and modifications to operating conditions can be devised by those skilled in the art without departing from the invention. Accordingly, the present invention is intended to embrace all such alternatives, modifications and variances which fall with the scope of the following amended claims.

I claim:

1. An improved partially-open oxygen-fuel fired turbine powered cogeneration cycle system, with high system thermal efficiencies and low fugitive system exhaust gas emissions for use in generating electric power and for heating of process fluids or gases exclusively using liquid or gaseous hydrocarbon fuel, the cogeneration system comprising:
   (a) a gas turbine/generator unit assembly configured to operate within the partially-open cycle to develop a shaft mechanical energy output, the gas turbine power assembly including,
      (1) an exhaust gas recycle compressor section configured to compress an inlet supplied re-circulated recycle gas to a higher pressure and temperature prior to the now identified 'primary re-pressurized recycle gas' being discharged from the gas turbine power assembly,
      (2) one or more combustion chamber assemblies in which supplied controlled streams of fuel, predominant oxygen mixture, cooled primary re-pressurized recycle gas are mixed and combusted in the presence of an additional controlled supplied second stream of 'working motive composition gases',
      (3) a hot gas expander power turbine assembly connected to and downstream of a hot exhaust gas flow conduiting means therein providing an interconnecting supplied stream of highly superheated working motive exhaust gases between the upstream connected combustion chamber assembly's outlet and the downstream connected hot gas expander, the supplied flow of working motive fluid gases then being expanded through the expander turbine assembly to produce an efficient energy conversion into mechanical horsepower transmitted by the expander turbine's output shaft;
   (b) an electric generator shaft-driven by supplied mechanical horsepower transmitted through shaft means from the expansion turbine's output shaft, the generator further including,
      (1) a shaft connecting means which can include a shaft connected gearbox and shaft couplings,
      (2) an electric power output transmitted through conduiting means to a control room module which therein can contain the turbine power assembly's PLC control panel, electrical switchgear, and motor control center, whereby electric power production is controlled and distributed to the power cogeneration facility's electrical grid and/or connected electric utility grid;
   (b) a first conduit transporting combustion chamber exhaust gases and having two ends, one end downstream of and connected to the combustion chamber assembly, the other first conduit end connected to the hot gas expander power turbine assembly,
   (c) a hot gas expander power turbine assembly configured to accept and expand the higher pressure and higher temperature exhaust gases from the combustion chamber assembly to a lower pressure and lower temperature power turbine exhaust condition to produce mechanical horsepower transmitted by the turbine's output shaft, the turbine exhaust being discharged into a second conduit,
   (d) a second conduit transporting the hot gas expander turbine's discharged exhaust gases containing recoverable waste heat, the second conduit having two ends, one end downstream of and connected to the hot gas expander turbine assembly, the second conduit's downstream end having two parallel-positioned branches,
      (1) the first branch of the second conduit configured to transport a first portion of the hot gas expansion turbine's discharged gases, the first branch end connected downstream to the inlet of a waste heat recovery unit exchanger,
      (2) the second branch of the second conduit configured to transport a second portion of the hot gas expander turbine's discharged gases, the second branch end-connected downstream to the inlet of a first waste heat recovery steam generator or waste heat recovery process fluid heat exchanger, the second branch additionally comprising an auxiliary side-branch end-connected to a blind flange closure means;
   (e) a waste heat recovery unit exchanger inlet connected to the downstream end of the first branch of the second conduit, the waste heat recovery unit exchanger configured to transfer recoverable waste heat energy from the turbine exhaust gases supplied by the first branch of the second conduit to the exchanger unit's two integral parallel contained heat exchanger sections containing supplied inlet flows of primary re-pressurized recycle gases,
   (f) a first waste heat recovery steam generator or waste heat recovery process fluid heat exchanger inlet connected to the downstream end of the second branch of the second conduit, the first waste heat recovery steam generator or waste heat recovery process fluid heat exchanger configured to transfer recoverable waste heat energy from the turbine exhaust gases supplied through the second branch of the second conduit, the recoverable waste heat transferred to an exchanger fluid exchanger section connected to either process fluid circuit stream flows supplied from a remote source or to steam generation fluid circuit stream flow originating from another source,
   (g) a third conduit referred to as a 're-circulated exhaust gas manifold' transporting recirculated exhaust gases, the third conduit having two ends, one end upstream of and connected to a downstream positioned second waste heat recovery steam generator or waste heat recovery process fluid exchanger, the third conduit's upstream end connecting to two parallel-positioned branches,
      (1) the first branch of the third conduit configured to transport a first controlled portion of recirculated exhaust gases, the first branch upstream end connected to the outlet of the waste heat recovery unit exchanger,
      (2) the second branch of the third conduit configured to transport a second controlled portion of recirculated exhaust gases, the second branch upstream end connected to the outlet of the waste heat recovery steam generator or waste heat recovery process fluid heat exchanger;
   (h) a second waste heat recovery steam generator or waste heat recovery process fluid exchanger inlet connected to the third conduit transporting recirculated exhaust gases, the waste heat exchanger configured to transfer recoverable waste heat energy from the third conduit's recirculated exhaust gases to either a process fluid stream flow supplied from a remote source or to a steam generation fluid circuit stream flow originating from another source, (i) a fourth conduit having two ends and referred to as an exhaust gas distribution manifold which transports recirculated exhaust gases at a reduced temperature, the fourth conduit having two ends, one end upstream connected to the outlet of the second waste heat recovery steam generator or waste heat recovery process fluid exchanger, the fourth conduit's other end connected to a blind flange closure means, the fourth conduit having two side branches, (1) the first side-branch of the fourth conduit configured to transport and exhaust or vent a controlled lesser mass first flow portion of the exhaust gas distribution manifold's recirculated exhaust gas to atmosphere during the system's operation in a steady-state mode of power generation, (2) the second side-branch of the fourth conduit configured to transport a second and predominant portion of the total mass flow of the fourth conduit's re-circulated exhaust gases to an inlet of a primary recycle compressor;

(j) a primary recycle gas compressor having an inlet connected to the fourth conduit's second branch's downstream end, the primary recycle gas compressor including, (1) a compressor input shaft accepting a connected mechanical shaft drive means, the shaft means providing a direct source of power connection to one or more high pressure stages within the hot gas expander turbine, (2) the primary recycle compressor configured as either a centrifugal or axial type, (3) a means to increase the pressure and temperature of the compressor's supplied recirculated gases predominantly comprising a mixture of carbon dioxide and water vapor gases of low superheat temperature, and to discharge the gases into a downstream connected fifth conduit;

(k) the fifth conduit configured to transport the primary recycle compressor's discharged flow of primary re-pressurized recycle gases, the fifth conduit having two ends and a side branch, one end downstream of and connected to the primary recycle compressor, and the fifth conduit's side branch downstream end-connected to and transporting a third controlled lesser flow portion of primary re-pressurized recycle gases to the gas inlet of an air-cooled heat exchanger, the fifth conduit's downstream-positioned second end comprising two parallel-positioned end branches, (1) the first end branch of the fifth conduit configured to transport a controlled first portion of primary re-pressurized recycle gases end-connected downstream to the inlet gas header of the earlier cited waste heat recovery unit exchanger's first parallel-positioned gas section therein further transporting the supplied primary re-pressurized recycle gases, (2) the second end branch of the fifth conduit configured to transport a controlled second portion of primary re-pressurized recycle gases, the second branch end connected downstream to the inlet gas header of the earlier cited waste heat recovery unit exchanger's second parallel-positioned gas section therein further transporting primary re-pressurized recycle gases;

(l) a sixth conduit configured to transport a first stream of invention defined 'working motive fluid' composition gases of increased temperature, the sixth conduit having two ends, one end downstream of and connected to the outlet header of the first parallel gas section contained within the waste heat gas recovery unit exchanger, the sixth conduit's second end downstream connected to the tertiary zone contained within the combustion chamber assembly, (m) a seventh conduit configured to transport a second stream of invention defined 'working motive fluid' composition gases of increased temperature, the conduit having two ends, one end downstream of and connected to the outlet header of the second parallel gas section contained within the waste heat gas recovery unit exchanger, the seventh conduit second end downstream connected to the primary combustion zone contained within the combustion chamber assembly, (n) an eighth conduit configured to transport a controlled flow stream of the liquid or gaseous hydrocarbon fuel, the eighth conduit having two ends, one end downstream of and connected to the source of the fuel, the eight conduit's second end having downstream flow communication to the partial premixer subassembly within the combustion chamber assembly, (o) a ninth conduit configured to transport a controlled flow stream of the predominant oxygen gas mixture, the ninth conduit having two ends, one end downstream of and connected to the source of the predominant oxygen gas mixture, the ninth conduit's second end having downstream flow communication to the partial premixer subassembly within the combustion chamber assembly, (p) a tenth conduit configured to transport a third and lesser portion of reduced temperature primary re-pressurized recycle gases, the tenth conduit having two ends, one end downstream of and connected to the gas outlet of the air-cooled heat exchanger, the tenth conduit's second end having downstream flow communication to the partial premixer subassembly within the combustion chamber assembly, (q) a means for system control and safety monitoring configured to maintain the cited system's generated power performance, control of gas stream flows, and stream gases in their cited superheated gaseous state.

2. The partially-open oxygen-fuel fired turbine power cogeneration cycle system of claim 1 wherein the oxygen-fuel fired combustion chamber assembly including:

(a) a combustion chamber assembly adapted for mixing and combusting controlled supplied streams of a liquid or gaseous hydrocarbon fuel and a pressurized predominate oxygen mixture in the presence of system supplied primary re-pressurized recycle gases and working motive fluid gases, the combustion chamber assembly including, (1) one or more individual partial premixer subassemblies having connectivity to controlled supply of pressurized flow streams that can include fuel, predominate oxygen mixture, and a cooled lesser portion of the system's total flow of primary re-pressurized recycle exhaust gases, (2) a primary combustion zone connected to and positioned downstream of the partial premixer subassembly, the primary combustion zone configured for combusting the controlled pressurized streams of fuel and predominate oxygen mixture to produce a mass flow of pressurized and highly superheated fuel combustion gas products, the primary combustion zone additionally configured to accept a much greater controlled mass flow of the controlled second stream containing the invention's described 'working motive fluid' gases having a predominant mixture of carbon dioxide and water vapor gases, the second controlled stream of working motive fluid gases therein comprising a substantially lesser superheat temperature than the fuel combustion products temperature, (3) a tertiary blending zone connected to and positioned downstream of the primary combustion zone, the tertiary zone configured for receiving the mass flow of highly superheated and pressurized gases discharged from the primary combustion zone, the tertiary blending zone additionally configured to accept a greater controlled mass and lesser superheated flow stream containing the invention's described 'working motive fluid' having a predominant mixture of carbon dioxide and water vapor gases, the tertiary blending zone therein blending the cited entering streams of gases to produce a pressurized resultant controlled temperature of working motive fluid gases discharged from the tertiary blending zone within the combustion chamber assembly.

3. The partially-open oxygen-fuel fired gas turbine power cogeneration cycle system of claim 1 wherein the control means can be provided by a manufacturer's programmable logic controller based control panel control means can be provided by a manufacturer's programmable logic controller based control panel, the system controlled devices including:

(a) a first control valve in communication with the first branch of the third conduit, (b) a second control valve in communication with the second branch of the third conduit, (c) a third and fourth series-positioned control valve in communication with the first branch of the fourth conduit, (d) a fifth control valve in communication with the fourth conduit, (e) a sixth control valve in communication with the eighth conduit, (f) a seventh control valve in communication with the ninth conduit, (g) an eighth control valve in communication with the first branch of the fifth conduit, and (h) a ninth control valve in communication with the second branch of the fifth conduit.

4. The partially-open oxygen-fuel fired power cogeneration cycle system of claim 1 wherein the control means maintains the temperature inside the primary combustion zone during combustion at or below 2,400 degrees Fahrenheit.

5. The partially-open oxygen-fuel fired power cogeneration cycle system of claim 1 wherein the control means optimizes the mass flow of the liquid or gaseous hydrocarbon fuel and predominant oxygen mixture entering the system, relative to the electric power output demand imposed on the power generation system.

6. An improved partially-open oxygen-fuel fired turbine powered cogeneration cycle system, with high system thermal efficiencies and low fugitive system exhaust gas emissions for use in generating electric power and for heating of process fluids or gases exclusively using liquid or gaseous hydrocarbon fuel, the cogeneration system comprising a hot gas expander turbine/generator unit and separately-driven compressor assembly combination within the system, therein including:

(a) a gas turbine/generator unit assembly configured to operate within the partially-open cycle to develop a shaft mechanical energy output, the gas turbine power unit assembly including, (1) one or more combustion chamber assemblies in which supplied controlled streams of fuel, predominant oxygen mixture, and cooled primary re-pressured recycle gas are mixed and combusted in the presence of an additional controlled supplied second stream of 'working motive composition gases', (2) a hot gas expander power turbine unit assembly connected to and downstream of a hot exhaust gas flow conduiting means therein providing an interconnecting supplied stream of highly superheated combustion chamber assembly exhaust gases between the upstream connected combustion chamber assembly's outlet and the downstream connected hot gas expander power turbine unit assembly, the supplied flow of working motive fluid gases then being expanded through the hot gas expander power turbine unit assembly to produce an efficient energy conversion into mechanical horsepower transmitted by the expander power-turbine unit's output shaft;

(b) an electric generator shaft-driven by supplied mechanical horsepower transmitted through shaft means from the hot gas expander power turbine unit's output shaft, the generator further including, (1) a shaft connecting means which can include a shaft connected gearbox and shaft couplings, (2) an electric power output transmitted through conduiting means to a control room module which therein can contain the turbine power assembly's PLC control panel, electrical switchgear, and motor control center, whereby electric power production is controlled and distributed to the power cogeneration facility's electrical grid and/or connected electric utility grid;

(b) a first conduit conveying combustion chamber exhaust gases and having two ends, one end downstream of and connected to the combustion chamber assembly, the other first conduit end connected to the hot gas expander power turbine unit assembly, (c) a hot gas expander power turbine unit assembly configured to accept and expand the higher pressure and higher temperature exhaust gases from the combustion chamber assembly to a lower pressure and lower temperature power turbine unit exhaust condition to produce mechanical horsepower transmitted by the power turbine unit's output shaft, the turbine exhaust being discharged into a second conduit, (d) a second conduit transporting the hot gas expander power turbine unit's discharged exhaust gases containing recoverable waste heat, the second conduit having two ends, one end downstream of and connected to the hot gas expander turbine unit assembly, the second conduit's downstream end having two parallel-positioned branches, (1) the first branch of the second conduit configured to transport a first portion of the hot gas expansion turbine's discharged gases, the first branch end connected downstream to the inlet of a waste heat recovery unit exchanger, (2) the second branch of the second conduit configured to transport a second portion of the hot gas expander turbine's discharged gases, the second branch end-connected downstream to the inlet of a first waste heat recovery steam generator or waste heat recovery process fluid heat exchanger, the second branch additionally comprising an auxiliary side-branch end-connected to a blind flange closure means;

(e) a waste heat recovery unit exchanger inlet connected to the downstream end of the first branch of the second conduit, the waste heat recovery unit exchanger configured to transfer recoverable waste heat energy from the turbine exhaust gases supplied by the first branch of the second conduit to the exchanger unit's two integral parallel contained heat exchanger sections containing supplied inlet flows of primary re-pressurized recycle gases as further described later, (f) a first waste heat recovery steam generator or waste heat recovery process fluid heat exchanger inlet connected to the downstream end of the second branch of the second conduit, the first waste heat recovery steam generator or waste heat recovery process fluid heat exchanger configured to transfer recoverable waste heat energy from the turbine exhaust gases supplied through the second branch of the second conduit, the recoverable waste heat transferred to an exchanger fluid exchanger section connected to either process fluid circuit stream flows supplied from a remote source or to a steam generation fluid circuit stream flow originating from another source, (g) a third conduit referred to as a 're-circulated exhaust gas manifold' transporting recirculated exhaust gases, the third conduit having two ends, one end upstream of and connected to a downstream positioned second waste heat recovery steam generator or waste heat recovery process fluid exchanger, the third conduit's upstream end connecting to two parallel-positioned branches, (1) the first branch of the third conduit configured to transport a first controlled portion of recirculated exhaust gases, the first branch upstream end connected to the outlet of the waste heat recovery unit exchanger, (2) the second branch of the third conduit configured to transport a second controlled portion of recirculated exhaust gases, the second branch upstream end connected to the outlet of the waste heat recovery steam generator or waste heat recovery process fluid heat exchanger;

(h) a second waste heat recovery steam generator or waste heat recovery process fluid exchanger inlet connected to the third conduit transporting recirculated exhaust gases, the waste heat exchanger configured to transfer recoverable waste heat energy from the third conduit's recirculated exhaust gases to either a process fluid stream flow supplied from a remote source or to a steam generation fluid circuit stream flow originating from another source, (i) a fourth conduit having two ends and referred to as an exhaust gas distribution manifold which transports recirculated exhaust gases at a reduced temperature, the fourth conduit having two ends, one end upstream connected to the outlet of the second waste heat recovery steam generator or waste heat recovery process fluid exchanger, the fourth conduit's other end connected to a blind flange closure means, the fourth conduit having two side branches, (1) the first side-branch of the fourth conduit configured to transport and exhaust or vent a controlled lesser mass first flow portion of the exhaust gas distribution manifold's recirculated exhaust gas to atmosphere during the system's operation in a steady-state mode of power generation, (2) the second side-branch of the fourth conduit configured to transport a second and predominant portion of the total mass flow of the fourth conduit's re-circulated exhaust gases to an inlet of a primary recycle compressor;

(j) a primary recycle gas compressor having an inlet connected to the fourth conduct's second branch's downstream end, the primary recycle gas compressor including, (1) a compressor input shaft accepting a connected mechanical shaft drive means, the shaft means providing either a direct source of power connection to an electric motor or steam turbine driver, or alternately the shaft drive means therein comprising a gear box with couplings that can be end-connected to either the electric motor or the steam turbine driver, (2) the primary recycle gas compressor configured as either a centrifugal or axial type, (3) a means to increase the pressure and temperature of the compressor's supplied recirculated gases predominantly comprising a mixture of carbon dioxide and water vapor gases of low superheat temperature, and to discharge the gases into a downstream connected fifth conduit;

(k) the fifth conduit configured to transport the primary recycle compressor's discharged flow of primary re-pressurized recycle gases, the fifth conduit having two ends and a side branch, one end downstream of and connected to the primary recycle compressor, and the fifth conduit's side branch downstream end-connected to and transporting a third controlled lesser flow portion of primary re-pressurized recycle gases to the gas inlet of an air-cooled heat exchanger, the fifth conduit's downstream-positioned second end comprising two parallel-positioned end branches, (1) the first end branch of the fifth conduit configured to transport a controlled first portion of primary re-pressurized recycle gases end-connected downstream to the inlet gas header of the earlier cited waste heat recovery unit exchanger's first parallel-positioned gas section therein further transporting the supplied primary re-pressurized recycle gases, (2) the second end branch of the fifth conduit configured to transport a controlled second portion of primary re-pressurized recycle gases, the second branch end connected downstream to the inlet gas header of the earlier cited waste heat recovery unit exchanger's second parallel-positioned gas section therein further transporting primary re-pressurized recycle gases;

(l) a sixth conduit configured to transport a first stream of invention defined 'working motive fluid' composition gases of increased temperature, the sixth conduit having two ends, one end downstream of and connected to the outlet header of the first parallel gas section contained within the waste heat gas recovery unit exchanger, the sixth conduit's second end downstream connected to the tertiary zone contained within the combustion chamber assembly, (m) a seventh conduit configured to transport a second stream of invention defined 'working motive fluid' composition gases of increased temperature, the conduit having two ends, one end downstream of and connected to the outlet header of the second parallel gas section contained within the waste heat gas recovery unit exchanger, the seventh conduit second end downstream connected to the primary combustion zone contained within the combustion chamber assembly, (n) an eighth conduit configured to transport a controlled flow stream of the liquid or gaseous hydrocarbon fuel, the eighth conduit having two ends, one end downstream of and connected to the source of the fuel, the eight conduit's second end having downstream flow communication to the partial premixer subassembly within the combustion chamber assembly, (o) a ninth conduit configured to transport a controlled flow stream of the predominant oxygen gas mixture, the ninth conduit having two ends, one end downstream of and connected to the source of the predominant oxygen gas mixture, the ninth conduit's second end having downstream flow communication to the partial premixer subassembly within the combustion chamber assembly, (p) a tenth conduit configured to transport a third and lesser portion of reduced temperature primary re-pressurized recycle gases, the tenth conduit having two ends, one end downstream of and connected to the gas outlet of the air-cooled heat exchanger, the tenth conduit's second end having downstream flow communication to the partial premixer subassembly within the combustion chamber assembly, (q) a means for system control and safety monitoring configured to maintain the cited system's generated power performance, control of gas stream flows, and stream gases in their cited superheated gaseous state.

7. The partially-open oxygen-fuel fired turbine power cogeneration cycle system of claim 6 wherein the oxygen-fuel fired combustion chamber assembly including:

(a) a combustion chamber assembly adapted for mixing and combusting controlled supplied streams of a liquid or gaseous hydrocarbon fuel and a pressurized predominant oxygen mixture in the presence of system supplied primary re-pressurized recycle gases and working motive fluid gases, the combustion chamber assembly including, (1) one or more individual partial premixer subassemblies having connectivity to controlled supply of pressurized flow streams that can include fuel, predominate oxygen mixture, and a cooled lesser portion of the system's total flow of primary re-pressurized recycle exhaust gases, (2) a primary combustion zone connected to and positioned downstream of the partial premixer subassemblies, the primary combustion zone configured for combusting the controlled pressurized streams of fuel and predominate oxygen mixture to produce a mass flow of pressurized and highly superheated fuel combustion gas products, the primary combustion zone additionally configured to accept a much greater controlled mass flow of the controlled second stream containing the invention's described 'working motive fluid' gases having a predominant mixture of carbon dioxide and water vapor gases, the second controlled stream of working motive fluid gases therein comprising a substantially lesser superheat temperature than the fuel combustion products temperature, (3) a tertiary blending zone connected to and positioned downstream of the primary combustion zone, the tertiary zone configured for receiving the mass flow of highly superheated and pressurized gases discharged from the primary combustion zone, the tertiary blending zone additionally configured to accept a greater controlled mass and lesser superheated flow stream containing the invention's described 'working motive fluid' having a predominant mixture of carbon dioxide and water vapor gases, the tertiary blending zone therein blending the cited entering streams of gases to produce a pressurized resultant controlled temperature of working motive fluid gases discharged from the tertiary blending zone within the combustion chamber assembly.

8. The partially-open oxygen-fuel fired gas turbine power cogeneration cycle system of claim 6 wherein the control means can be provided by a manufacturer's programmable logic controller based control panel, the system controlled devices including:

(a) a first control valve in communication with the first branch of the third conduit, (b) a second control valve in communication with the second branch of the third conduit, (c) a third and fourth series-positioned control valve in communication with the first branch of the fourth conduit, (d) a fifth control valve in communication with the fourth conduit, (e) a sixth control valve in communication with the eighth conduit, (f) a seventh control valve in communication with the ninth conduit, (g) an eighth control valve in communication with the first branch of the fifth conduit, and (h) a ninth control valve in communication with the second branch of the fifth conduit.

9. The partially-open oxygen-fuel fired power cogeneration cycle system of claim 6 wherein the control means maintains the temperature inside the primary combustion zone during combustion at or below 2,400 degrees Fahrenheit.

10. The partially-open oxygen-fuel fired power cogeneration cycle system of claim 6 wherein the control means optimizes the mass flow of the liquid or gaseous hydrocarbon fuel and predominant oxygen mixture entering the system, relative to the electric power output demand imposed on the power generation system.

11. A partially-open oxygen-fuel fired turbine powered cogeneration cycle system with high system thermal efficiencies and low fugitive system exhaust gas emissions for use in generating electric power and for heating of process fluids or gases through the exclusive use of liquid or gaseous hydrocarbon fuel, the system incorporating supplementary means that enables the system to sustain or to increase a production of heated process fluids and/or steam or hot water, regardless of the partially-open cogeneration system's production of mechanical or electric power, the partially-open cogeneration system including:

(a) a gas turbine/generator unit assembly configured to operate within the partially-open cycle to develop a shaft mechanical energy output, the gas turbine power assembly including, (1) an exhaust gas recycle compressor section configured to compress an inlet supplied re-circulated recycle gas to a higher pressure and temperature prior to the now identified 'primary re-pressurized recycle gas' being discharged from the gas turbine power assembly,
(2) one or more combustion chamber assemblies in which supplied controlled streams of fuel, predominant oxygen mixture, cooled primary re-pressured recycle gas are mixed and combusted in the presence of an additional controlled supplied second stream of 'working motive composition gases',
(3) a hot gas expander power turbine assembly connected to and downstream of a hot exhaust gas flow conduiting means therein providing an interconnecting supplied stream of highly superheated working motive exhaust gases between the upstream connected combustion chamber assembly's outlet and the downstream connected hot gas expander, the supplied flow of working motive fluid gases then being expanded through the expander turbine assembly to produce an efficient energy conversion into mechanical horsepower transmitted by the expander turbine's output shaft;

(b) an electric generator shaft-driven by supplied mechanical horsepower transmitted through shaft means from the expansion turbine's output shaft, the generator further including,
(1) a shaft connecting means which can include a shaft connected gearbox and shaft couplings,
(2) an electric power output transmitted through conduiting means to a control room module which therein can contain the turbine power assembly's PLC control panel, electrical switchgear, and motor control center, whereby electric power production is controlled and distributed to the power cogeneration facility's electrical grid and/or connected electric utility grid;

(b) a first conduit transporting combustion chamber exhaust gases and having two ends, one end downstream of and connected to the combustion chamber assembly, the other first conduit end connected to the hot gas expander power turbine assembly, (c) a hot gas expander power turbine assembly configured to accept and expand the higher pressure and higher temperature exhaust gases from the combustion chamber assembly to a lower pressure and lower temperature power turbine exhaust condition to produce mechanical horsepower transmitted by the turbine's output shaft, the turbine exhaust being discharged into a second conduit, (d) a second conduit transporting the hot gas expander turbine's discharged exhaust gases containing recoverable waste heat, the second conduit having two ends, one end downstream of and connected to the hot gas expander turbine assembly, the second conduit's downstream end having two parallel-positioned branches,
(1) the first branch of the second conduit configured to transport a first portion of the hot gas expansion turbine's discharged gases, the first branch end connected downstream to the inlet of a waste heat recovery unit exchanger,
(2) the second branch of the second conduit configured to transport a second portion of the hot gas expander turbine's discharged gases, the second branch end-connected downstream to the inlet of a first waste heat recovery steam generator or waste heat recovery process fluid heat exchanger, the second branch additionally comprising an auxiliary side-branch end-connected to flange-connecting conduit supplying a transported flow of supplementary oxygen-fuel fired heater-burner exhaust gases;

(e) a waste heat recovery unit exchanger inlet connected to the downstream end of the first branch of the second conduit, the waste heat recovery unit exchanger configured to transfer recoverable waste heat energy from the turbine exhaust gases supplied by the first branch of the second conduit to the exchanger unit's two integral parallel contained heat exchanger sections containing supplied inlet flows of primary re-pressurized recycle gases as further described later, (f) a first waste heat recovery steam generator or waste heat recovery process fluid heat exchanger inlet connected to the downstream end of the second branch of the second conduit, the first waste heat recovery steam generator or waste heat recovery process fluid heat exchanger configured to transfer recoverable waste heat energy from the turbine exhaust gases supplied through the second branch of the second conduit, the recoverable waste heat transferred to an exchanger fluid exchanger section connected to either process fluid circuit stream flows supplied from a remote source or to a steam generation fluid circuit stream flow originating from another source, (g) a third conduit referred to as a 're-circulated exhaust gas manifold' transporting recirculated exhaust gases, the third conduit having two ends, one end upstream of and connected to a downstream positioned second waste heat recovery steam generator or waste heat recovery process fluid exchanger, the third conduit's upstream end connecting to two parallel-positioned branches,
(1) the first branch of the third conduit configured to transport a first controlled portion of recirculated exhaust gases, the first branch upstream end connected to the outlet of the waste heat recovery unit exchanger,
(2) the second branch of the third conduit configured to transport a second controlled portion of recirculated exhaust gases, the second branch upstream end connected to the outlet of the waste heat recovery steam generator or waste heat recovery process fluid heat exchanger;

(h) a second waste heat recovery steam generator or waste heat recovery process fluid exchanger inlet connected to the third conduit transporting recirculated exhaust gases, the waste heat exchanger configured to transfer recoverable waste heat energy from the third conduit's recirculated exhaust gases to either a process fluid stream flow supplied from a remote source or to a steam generation fluid circuit stream flow originating from another source, (i) a fourth conduit having two ends and referred to as an exhaust gas distribution manifold which transports recirculated exhaust gases at a reduced temperature, the fourth conduit having two ends, one end upstream connected to the outlet of the second waste heat recovery steam generator or waste heat recovery process fluid exchanger, the fourth conduit's other end downstream flanged connected to a later described eleventh conduct, the fourth conduit having two side branches,
(1) the first side-branch of the fourth conduit configured to transport and exhaust or vent a controlled lesser mass first flow portion of the exhaust gas distribution manifold's recirculated exhaust gas to atmosphere during the system's operation in a steady-state mode of power generation,
(2) the second side-branch of the fourth conduit configured to transport a second and predominant portion of the total mass flow of the fourth conduit's re-circulated exhaust gases to an inlet of a primary recycle compressor;
(j) a primary recycle gas compressor having an inlet connected to the fourth conduct's second branch's downstream end, the primary recycle gas compressor including,
(1) a means to increase the pressure and temperature of the compressor's supplied recirculated gases predominantly comprising a mixture of carbon dioxide and water vapor gases of low superheat temperature and to discharge the gases into a downstream connected fifth conduit,
(2) a compressor input shaft accepting a connected mechanical shaft drive means, the shaft means providing either a direct source of power connection to one or more high pressure stages within a hot gas expander turbine, or alternately the shaft drive means therein comprising a gear box with couplings that can be end-connected to either an electric motor or a steam turbine,
(3) a primary recycle gas compressor configuration of either the centrifugal or axial type;
(k) the fifth conduit configured to transport the primary recycle compressor's discharged flow of primary re-pressurized recycle gases, the fifth conduit having two ends and a side branch, one end downstream of and connected to the primary recycle compressor, and the fifth conduit's side branch downstream end-connected to and transporting a third controlled lesser flow portion of primary re-pressurized recycle gases to the gas inlet of an air-cooled heat exchanger, the fifth conduit's downstream-positioned second end comprising two parallel-positioned end branches,
(1) the first end branch of the fifth conduit configured to transport a controlled first portion of primary re-pressurized recycle gases end-connected downstream to the inlet gas header of the earlier cited waste heat recovery unit exchanger's first parallel-positioned gas section therein further transporting the supplied primary re-pressurized recycle gases,
(2) the second end branch of the fifth conduit configured to transport a controlled second portion of primary re-pressurized recycle gases, the second branch end connected downstream to the inlet gas header of the earlier cited waste heat recovery unit exchanger's second parallel-positioned gas section therein further transporting primary re-pressurized recycle gases;
(l) a sixth conduit configured to transport a first stream of invention defined 'working motive fluid' composition gases of increased temperature, the sixth conduit having two ends, one end downstream of and connected to the outlet header of the first parallel gas section contained within the waste heat gas recovery unit exchanger, the sixth conduit's second end downstream connected to the tertiary zone contained within the combustion chamber assembly,
(m) a seventh conduit configured to transport a second stream of invention defined 'working motive fluid' composition gases of increased temperature, the conduit having two ends, one end downstream of and connected to the outlet header of the second parallel gas section contained within the waste heat gas recovery unit exchanger, the seventh conduit second end downstream connected to the primary combustion zone contained within the combustion chamber assembly,
(n) an eighth conduit configured to transport a controlled flow stream of the liquid or gaseous hydrocarbon fuel, the eighth conduit having two ends, one end downstream of and connected to the source of the fuel, the eight conduit's second end having downstream flow communication to the partial premixer subassembly within the combustion chamber assembly,
(o) a ninth conduit configured to transport a controlled flow stream of the predominant oxygen gas mixture, the ninth conduit having two ends, one end downstream of and connected to the source of the predominant oxygen gas mixture, the ninth conduit's second end having downstream flow communication to the partial premixer subassembly within the combustion chamber assembly,
(p) a tenth conduit configured to transport a third and lesser portion of reduced temperature primary re-pressurized recycle gases, the tenth conduit having two ends, one end downstream of and connected to the gas outlet of the air-cooled heat exchanger, the tenth conduit's second end having downstream flow communication to the partial premixer subassembly within the combustion chamber assembly,
(q) an eleventh conduit configured to transport recirculated exhaust gases at a reduced temperature, the fourth conduit having two ends, one end upstream connected to the flanged end outlet of the fourth conduit, referred to as the 'exhaust distribution manifold', the eleventh conduct's second end comprising downstream first and second parallel conduit branches,
(1) the first branch end downstream connected to an inlet of a first exhaust recycle gas blower of the speed-control motor-driven type, the first branch of the eleventh conduit incorporating a control valve,
(2) the second branch end downstream connected to an inlet of a second exhaust recycle gas blower of the speed-control motor-driven type, the second branch of the eleventh conduit incorporating a control valve;
(r) a twelfth conduit having two ends, one end downstream of and connected to the outlet of the first exhaust recycle gas blower, the twelfth conduit's second end having downstream communication with the partial-premix subassembly contained within a oxygen-fuel fired combustion heater-burner assembly,
(s) a thirteenth conduit having two ends, one end downstream of and connected to the outlet of the second exhaust recycle gas blower, the thirteenth conduit's second end having downstream communication with the tertiary zone contained within the oxygen-fuel fired combustion heater-burner assembly,
(t) the exhaust recycle gas blowers configured to re-pressurize the blower inlet supplied and slightly superheated recirculated exhaust gases to a increased pressure level required for the gases transport through conduits thirteen and fourteen having end-connection to the downstream-positioned oxygen-fuel fired heater-burner assembly, and
(q) a means for system control and safety monitoring configured to maintain the cited system's generated power performance, control of gas stream flows, and stream gases in their cited superheated gaseous state.

12. The partially-open oxygen-fuel fired turbine power cogeneration cycle system of claim 11 wherein a oxygen-fuel fired combustion heater-burner assembly includes:
  (a) the combustion heater-burner assembly adapted for mixing and combusting controlled supplied pressurized streams of a liquid or gaseous hydrocarbon fuel and predominate oxygen mixture in the presence of exhaust recycle gas blower supplied re-pressurized recycle gases, the combustion heater-burner assembly including,
    (1) one or more individual partial premixer subassemblies having connectivity to controlled supply of pressurized flow streams that can include fuel, predominate oxygen mixture, and the first blower's supplied re-pressurized recycle exhaust gases,
    (2) a primary combustion zone connected to and positioned downstream of the partial premixer subassembly, the primary combustion zone configured for combusting the controlled pressurized streams of fuel and predominate oxygen mixture in the controlled presence of a greater mass flow of re-pressurized recycle gases to produce a resulting mass flow of pressurized and highly superheated primary combustion zone exhaust gases predominantly comprised of carbon dioxide and superheated water vapor,
    (3) a tertiary blending zone connected to and positioned downstream of the primary combustion zone, the tertiary zone configured for receiving a mass flow of highly superheated and pressurized gases discharged from the primary combustion zone, the tertiary blending zone additionally configured to accept a first blower supplied controlled mass flow of re-pressurized recycle gases of lesser superheat temperature and having a predominant mixture of carbon dioxide and water vapor gases, the tertiary blending zone therein blending the cited entering streams of gases to produce a pressurized resultant controlled temperature of exhaust gases discharged from the tertiary blending zone within the combustion heater-burner chamber assembly, and
  (b) a fifteenth conduit having two ends, one end downstream of and connected to the outlet of the oxygen-fuel fired combustion heater-burner assembly, the fifteenth conduit's second end having downstream communication with an auxiliary branch contained within a second end branch of the second conduit having a downstream connectivity with a first waste heat recovery steam generator heat exchanger or waste heat recovery process fluid heat exchanger.

13. The partially-open oxygen-fuel fired gas turbine power cogeneration cycle system of claim 11 wherein the control means can be provided by a manufacturer's programmable logic controller based control panel, the system controlled devices including:
  (a) a first control valve in communication with the first branch of the third conduit,
  (b) a second control valve in communication with the second branch of the third conduit,
  (c) a third and fourth series-positioned control valve in communication with the first branch of the fourth conduit,
  (d) a fifth control valve in communication with the fourth conduit,
  (e) a sixth control valve in communication with the eighth conduit,
  (f) a seventh control valve in communication with the ninth conduit,
  (g) an eighth control valve in communication with the first branch of the fifth conduit,
  (h) a ninth control valve in communication with the second branch of the fifth conduit,
  (i) a tenth control valve in communication with the first branch of the eleventh conduit,
  (j) a eleventh control valve in communication with the second branch of the eleventh conduit,
  (k) a twelfth control valve in communication with the fourteenth conduit.

14. The partially-open oxygen-fuel fired power cogeneration cycle system of claim 11 wherein the control means maintains the temperature inside the cited combustion chamber assembly's and combustion heater-burner assembly's primary combustion zones during combustion at or below 2,400 degrees Fahrenheit.

15. The partially-open oxygen-fuel fired power cogeneration cycle system of claim 11 wherein the control means optimizes the mass flow of the liquid or gaseous hydrocarbon fuel and predominant oxygen mixture entering the system, relative to the electric power output demand imposed on the power generation system and/or heating of remotely supplied process fluids including hot water or steam generating streams.

* * * * *